(12) United States Patent
Maisonnier et al.

(10) Patent No.: US 8,942,849 B2
(45) Date of Patent: Jan. 27, 2015

(54) HUMANOID ROBOT EQUIPPED WITH A NATURAL DIALOGUE INTERFACE, METHOD FOR CONTROLLING THE ROBOT AND CORRESPONDING PROGRAM

(75) Inventors: Bruno Maisonnier, Paris (FR); Jérôme Monceaux, Paris (FR)

(73) Assignee: Aldebaran Robotics, Paris (FR)

( * ) Notice: Subject to any disclaimer, the term of this patent is extended or adjusted under 35 U.S.C. 154(b) by 179 days.

(21) Appl. No.: 13/811,204

(22) PCT Filed: Jul. 11, 2011

(86) PCT No.: PCT/EP2011/061743
§ 371 (c)(1),
(2), (4) Date: Feb. 19, 2013

(87) PCT Pub. No.: WO2012/010451
PCT Pub. Date: Jan. 26, 2012

(65) Prior Publication Data
US 2013/0218339 A1    Aug. 22, 2013

(30) Foreign Application Priority Data

Jul. 23, 2010  (FR) ...................................... 10 56047

(51) Int. Cl.
*G05B 15/00*     (2006.01)
*G06F 15/16*     (2006.01)

(52) U.S. Cl.
USPC ..... 700/250; 455/456.3; 370/352; 704/270.1; 707/10; 709/250; 709/206

(58) Field of Classification Search
USPC ................... 700/250, 245; 455/456.3, 404.1; 370/352; 704/270.1, 270; 707/10, 100; 709/250, 206, 226
See application file for complete search history.

(56) References Cited

U.S. PATENT DOCUMENTS 7,711,569 B2    5/2010  Takeuchi et al.
8,538,759 B2 *  9/2013  Homma et al. ............ 704/270.1
(Continued)

FOREIGN PATENT DOCUMENTS

EP        1321248 A1      6/2003
WO    2005/119642 A2     12/2005
(Continued)

OTHER PUBLICATIONS

E. Pot, et al, "Choregraphe: a Graphical Tool for Humanoid Robot Programming", The 18th IEEE International Symposium on Robot and Human Interactive Communication, Sep. 27, 2009, pp. 46-51, IEEE, Piscataway, NJ, USA, XP031563577.

*Primary Examiner* — Ronnie Mancho
(74) *Attorney, Agent, or Firm* — Baker and Hostetler LLP

(57) ABSTRACT

A humanoid robot equipped with an interface for natural dialog with an interlocutor is provided. Previously, the modalities of dialog between humanoid robots equipped moreover with evolved displacement functionalities and human beings are limited notably by the capabilities for voice and visual recognition processing that can be embedded onboard said robots. The present disclosure provides robots are presently equipped with capabilities to resolve doubt on a several modalities of communication of the messages that they receive and for combining these various modalities which make it possible to greatly improve the quality and the natural character of dialogs with the robots' interlocutors. This affords simple and user-friendly means for carrying out the programming of the functions making it possible to ensure the fluidity of these multimodal dialogs.

22 Claims, 22 Drawing Sheets

(56) References Cited

U.S. PATENT DOCUMENTS

| | | | |
|---|---|---|---|
| 8,706,915 B2* | 4/2014 | Duchesneau | 709/250 |
| 2005/0075116 A1* | 4/2005 | Laird et al. | 455/456.3 |
| 2005/0083915 A1* | 4/2005 | Mathew et al. | 370/352 |
| 2006/0031340 A1* | 2/2006 | Mathew et al. | 709/206 |
| 2006/0122837 A1 | 6/2006 | Kim et al. | |
| 2009/0216910 A1* | 8/2009 | Duchesneau | 709/250 |
| 2009/0254572 A1* | 10/2009 | Redlich et al. | 707/10 |
| 2009/0287678 A1 | 11/2009 | Brown et al. | |
| 2011/0029128 A1 | 2/2011 | Serre et al. | |

FOREIGN PATENT DOCUMENTS

| | | |
|---|---|---|
| WO | 2009/124951 A1 | 10/2009 |
| WO | 2009/124955 A2 | 10/2009 |
| WO | 2010/136427 A1 | 12/2010 |

\* cited by examiner

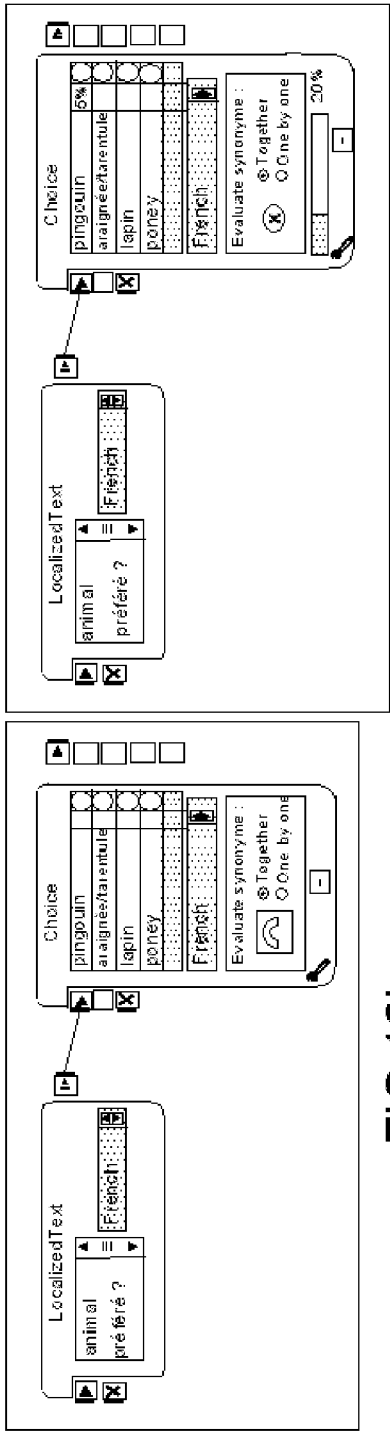
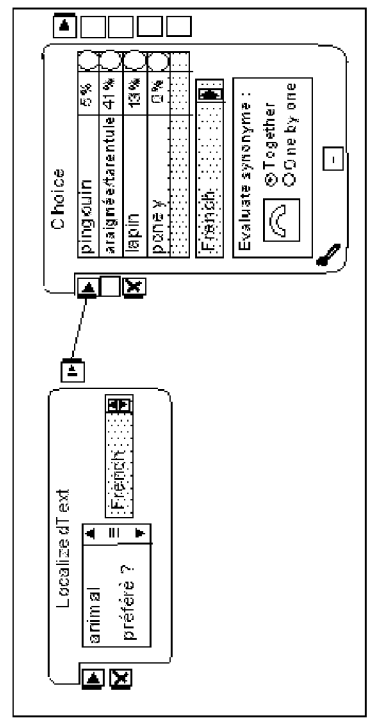
FIG.10b
FIG.10c
FIG.10d

HUMANOID ROBOT EQUIPPED WITH A NATURAL DIALOGUE INTERFACE, METHOD FOR CONTROLLING THE ROBOT AND CORRESPONDING PROGRAM

CROSS-REFERENCE TO RELATED APPLICATIONS

This application is a National Stage of International patent application PCT/EP2011/061743, filed on Jul. 11, 2011, which claims priority to foreign French patent application No. FR 1056047, filed on Jul. 23, 2010, the disclosures of which are incorporated by reference in their entirety.

FIELD OF THE INVENTION

The present invention belongs to the field of humanoid robots. More precisely, it applies to the methods for programming and employing interfaces for dialog with a robot of this type so as to allow the execution by said robot of actions on command of a user, the provision of appropriate answers by said robot and, in a more general manner, the establishment of "humanoid relations" between said robot and its interlocutor or interlocutors.

BACKGROUND

A robot may be described as humanoid as long as it possesses certain attributes of the appearance and functionalities of man: a head, a trunk, two arms, optionally two hands, two legs, two feet etc. Beyond appearance, the functions that a humanoid robot is capable of fulfilling will depend on its capacity to perform movements, to speak and to "reason". Humanoid robots are capable of walking, of making gestures, with the limbs or with the head. The complexity of the gestures that they are capable of performing is continually increasing.

Certain robots can speak, in response to stimuli from the environment. The development of speech recognition and synthesis tools has also made it possible to develop functions for dialog between certain robots and humans that significantly enrich the possibilities for interactions. Such man-robot interfaces using speech are disclosed notably by U.S. Pat. No. 7,711,569 as well as by the application published under the number US2009/287678.

In these prior art documents, the imperfections inherent in voice recognition are alleviated by recourse to semantic and/or contextual aids which require access to a database, learning and the use of significant calculation resources to be able to resolve doubts of recognition—low recognition confidence interval, false positives, false negatives etc. The use of these means is not appropriate in the case of a multifunction humanoid robot which must be economical in its calculation resources so as to manage its critical processes such as locomotion.

SUMMARY OF THE INVENTION

It would be advantageous to be able to have a humanoid robot capable of resolving doubt in respect of recognition performed by sensors and software which will remain imperfect in a simple and effective manner by using the calculation resources embedded onboard said robot.

The present invention solves this problem by affording an interface for dialog with a humanoid robot which uses a natural mode of confirmation of answers.

For this purpose, the present invention discloses a humanoid robot comprising at least two channels for natural communication of messages with at least one interlocutor according to different modalities, said at least two channels each being chosen from a group of channels comprising receive, send channels, and a control module for the inputs/outputs of said channels, wherein said control module is configured to improve the understanding of the messages received by said robot based on execution of at least one function chosen from a group of functions comprising a function of combining messages received/sent on a first channel and on a second channel, and a function of sending a second message generated based on a first message received on a channel.

Advantageously, said communication channels are chosen from a group of communication channels for sending and/or receiving audible, visual, tactile messages, messages regarding displacements and/or positions of at least one part of the robot, and digital messages.

Advantageously, a first communication channel is a sound send channel and a second communication channel is a channel for receiving displacements and/or positions from at least one part of the robot by said at least one interlocutor, said displacements and/or positions being representative of inputs communicated by the interlocutor to the robot, the specifications of said inputs being defined by the robot to the interlocutor by the message sent on the first channel.

Advantageously, the robot of the invention furthermore comprises a third tactile communication channel by which the interlocutor validates the inputs performed into the second channel.

Advantageously, a first communication channel is a channel for receiving sound messages and a second communication channel is a channel for sending sound messages and in that said control module is able to evaluate the confidence level of the understanding by said robot of a first message received on said first channel and to generate at least one second message on said second channel whose content depends on said confidence level.

Advantageously, the first channel comprises a filter for voice recognition of the messages received by a list of expressions with each of which is associated an expected recognition rate and in that the content of said second message is chosen by a heuristic from a group of requests comprising a request for repetition of said first message on the first channel, a request for confirmation by a third message to be sent by the interlocutor on the first channel of a subset of the expressions of the filter, and a request for sending by the interlocutor at least another message on at least a third channel.

Advantageously, the robot of the invention is configured for sending on the second channel a signal of start of listening on the first channel so as to ensure the sequencing in half-duplex mode of the messages on the first and the second channels.

Advantageously, said choice heuristic is a function of the position of the real recognition rates with respect to thresholds determined on the basis of the expected recognition rates.

Advantageously, said third channel is a channel for tactile reception or for receiving displacements from a part of the robot.

Advantageously, the robot of the invention furthermore comprises a module for interfacing with an electronic mail system, said interfacing module allowing a holder of an account on said electronic mail system to use said robot as agent for receiving/reading the electronic messages on the second channel, for writing/sending on the first channel and for administering said account by dialog, using said first and second channels.

Advantageously, said third channel is a channel for visual reception of images of objects corresponding to the list of expressions of the filter of the first channel, said images being compared with a database of images of said objects previously recorded with said expressions and which is accessible by said control module for the inputs/outputs of said communication channels.

Advantageously, a first communication channel is a channel for receiving visual messages and a second communication channel is a channel for sending sound messages and in that said control module is able to evaluate the confidence level of the understanding by said robot of a first message received on said first channel and to generate at least one second message on said second channel whose content depends on said confidence level.

Advantageously, the first channel comprises a filter for recognizing images of the messages received by a list of expressions with each of which is associated an expected recognition rate and in that the content of said second message is chosen by a heuristic from a group of requests comprising a request for repetition of said first message on the first channel, request for confirmation by a third message to be sent by the interlocutor on a third channel for receiving sound messages of a subset of the expressions of the filter, and a request for sending by the interlocutor of at least another message on at least a fourth channel.

Advantageously, at least one of the channels is a hybrid channel receiving as inputs the outputs of two channels, merged by said control module for the inputs and outputs.

The invention also discloses a method of control of the communications of a humanoid robot with at least one interlocutor comprising at least two steps of message transmission by communication channels using different modalities, said two steps each being chosen from a group of channels comprising receive, send channels, and a step of controlling the inputs/outputs of said channels, wherein said controlling step is configured to improve the understanding of the messages received by said robot based on execution of at least one function chosen from a group of functions comprising a function of combining messages received/sent on a first channel and on a second channel, and a function of sending a second message generated based on a first message received on a channel.

The invention also discloses a computer program comprising program code instructions allowing the execution of the method of the invention when the program is executed on a computer, said program being configured to allow a humanoid robot comprising at least two channels for natural communication of messages with at least one interlocutor according to different modalities, said at least two channels each being chosen from a group of channels comprising receive, send channels, and a subroutine for control of the inputs/outputs of said channels, wherein said control subroutine is configured to improve the understanding of the messages received by said robot based on execution of at least one function chosen from a group of functions comprising a function of combining messages received/sent on a first channel and on a second channel, and a function of sending a second message generated based on a first message received on a channel.

The invention also discloses a method of editing and controlling a communication interface between at least one humanoid robot and at least one interlocutor, said at least one humanoid robot comprising at least two channels for natural communication of messages with the at least one interlocutor according to different modalities, said at least two channels each being chosen from a group of channels comprising receive, send channels, and a control module for the inputs/outputs of said channels, said control module being configured to improve the understanding of the messages received by said robot based on execution of at least one function chosen from a group of functions comprising a function of combining messages received/sent on a first channel and on a second channel, and a function of sending a second message generated based of a first message received on a channel, further comprising a step of programming said chosen function.

Advantageously, said step of programming said chosen function comprises at least one sub-step of defining a first communication channel in the guise of sound send channel and a second communication channel in the guise of channel for receiving displacements of at least one limb of the robot by said at least one interlocutor, a sub-step of defining a correspondence between said displacements and inputs communicated by the interlocutor to the robot, and a sub-step of defining the specifications of said inputs by generating at least one message to be sent by the robot to the interlocutor on the first channel.

Advantageously, the method of editing and controlling of the invention furthermore comprises a sub-step of defining a third tactile communication channel whereby the interlocutor validates the inputs performed on the second channel.

Advantageously, said step of programming said chosen function comprises at least one sub-step of defining a first communication channel in the guise of channel for receiving sound messages and a second communication channel in the guise of channel for sending sound messages, a sub-step of defining a function for evaluating a confidence level of the understanding by said robot of a first message received on said first channel and a sub-step of defining the generation of at least one second message on said second channel whose content depends on said confidence level.

The invention also discloses a computer program comprising program code instructions for execution of the method of the invention when the program is executed on a computer, said program being configured to allow a user to program a humanoid robot comprising at least two channels for natural communication of messages with at least one interlocutor according to different modalities, said at least two channels each being chosen from a group of channels comprising receive, send channels, and a subroutine for controlling the inputs/outputs of said channels, wherein a module for programming in the subroutine for control of at least one function to be executed by the robot and chosen from the group of functions comprising a function of combining messages received/sent on a first channel and on a second channel, and a function of sending of a second message generated based on a first message received on a channel.

Advantageously, the computer program of the invention furthermore comprises a module for programming the passing of at least one parameter to a control Box.

The interface of the invention furthermore presents the advantage of offering multimodal confirmation modes which may be easily adapted to the environment in which the dialog is executed, for example if the ambient noise is too high for the voice recognition to be able to have any effectiveness. The user can thus be invited to replace/confirm ambiguous answers through a touch, a gesture or the display of a digital symbol, of particular color or shape. Thus the user has at his disposal means allowing him to replace or emulate in an intuitive manner the traditional interfaces that he is accustomed to using when he is opposite his computer or when he uses an intelligent telephone or a touchpad.

Furthermore, the modes of expression of the robot can themselves be multimodal, by combining notably intonation, gaze, gesture so as to maintain the attention of its interlocutor and to communicate to him emotions or clues about answers to be provided. Moreover, by approaching the natural modes of communication between humans, the interface of the invention contributes to improving the results of the recognition system and to enhancing the quality of the experience of the user immersed in a "real virtuality", that is to say that of a dialog with a physically incarnate avatar.

The invention also provides an ergonomic and versatile environment for developing these interfaces, which makes it possible to create very easily and in very little time new interaction scenarios specially adapted for uses of the robot that were not envisaged by its designer.

BRIEF DESCRIPTION OF THE DRAWINGS

The invention will be better understood and its various characteristics and advantages will emerge from the description which follows of several exemplary embodiments and its appended figures in which:

FIGS. 10a, 10b, 10c and 10d represent a sequence of screens making it possible to execute a voice recognition test comparing between several options of a list of choices in an embodiment of the invention;

FIGS. 12a, 12b, 12c and 12d represent a sequence of screens making it possible to execute a voice recognition test comparing between several options of a list of choices in a different language from that of the question in an embodiment of the invention;

DETAILED DESCRIPTION

Figure 1:
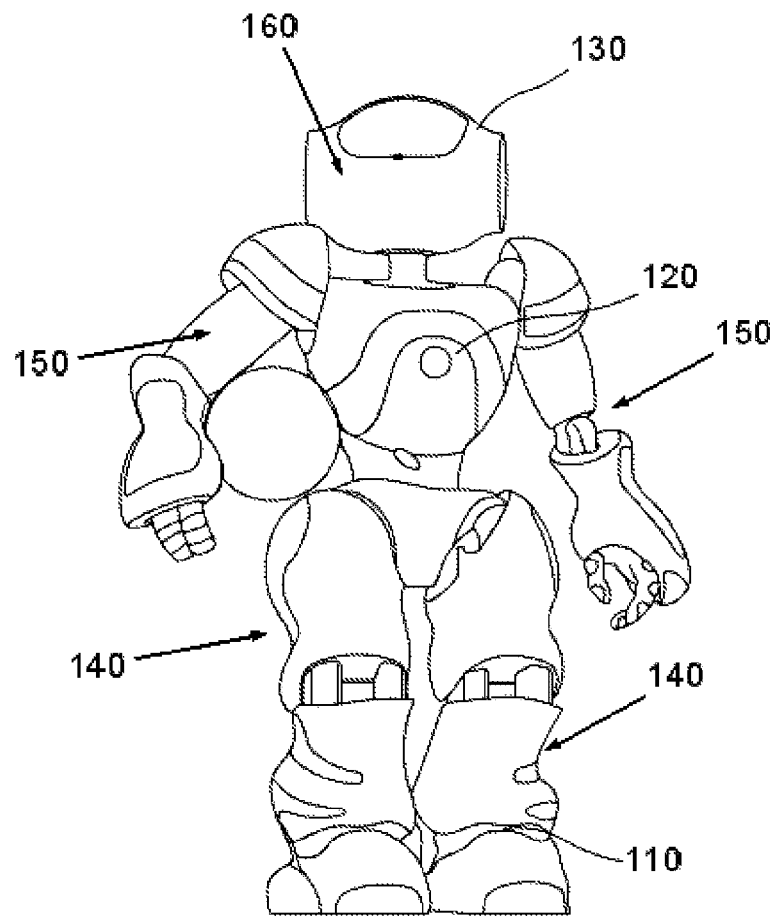
FIG. 1 is a diagram of the physical architecture of a humanoid robot in several embodiments of the invention.

FIG. 1 illustrates the physical architecture of a humanoid robot in an embodiment of the invention. Such a robot has been disclosed notably in patent application WO2009/124951 published on Oct. 15, 2009. This platform has served as the basis for the improvements which have led to the present invention. In the subsequent description, this humanoid robot may be called either by this generic term or by its trademark NAO™, without the generality of the reference being modified thereby.

This robot comprises about two dozen electronic cards of the type 110 for controlling sensors and actuators which drive the articulations. The card 110 shown in the figure is the one which controls the left foot. One of the virtues of the architecture is that the cards controlling the articulations are for the most part interchangeable. An articulation normally has at least two degrees of freedom and therefore two motors. Each motor is driven in terms of angle. The articulation also comprises several position sensors, notably MREs (Magnetic Rotary Encoders). The electronic control card comprises an off-the-shelf microcontroller. This may be for example a DSPIC™ from the company Microchip. It is a 16-bit MCU coupled to a DSP. This MCU has a looped slaving cycle of one ms. The robot can also comprise other types of actuators, notably LEDs (Light-emitting diodes) whose color and intensity can convey the emotions of the robot. The latter can also comprise other types of position sensors, notably an inertial unit, FSRs (Ground pressure sensors), etc.

The head 160 comprises the intelligence of the robot, notably the card 130 which executes the high-level functions which allow the robot to accomplish the missions which are assigned to it, notably, within the framework of the present invention, participation in games. The card 130 could however be situated elsewhere in the robot, for example in the trunk. It will be seen however that this location, when the head is removable, makes it possible to replace these high-level functions and therefore notably to completely change the intelligence of the robot and therefore its missions very rapidly. Or conversely to change one body with another (for example a defective body with a non-defective body) while retaining the same artificial intelligence. The head can also comprise specialized cards, notably for processing speech or vision or also for processing service inputs/outputs, such as the encoding necessary for opening a port to establish a remote communication on a WAN (Wide Area Network) wide area network. The processor of the card 130 may be an off-the-shelf x86 processor. A low-consumption processor such as the Geode™ from the company AMD (32 bits, 500 MHz) will be chosen in a favored manner. The card also comprises a set of RAM and flash memories. This card also manages the communications of the robot with the exterior (behaviors server, other robots etc.), normally on a WiFi, WiMax transmission layer, optionally on a public network for mobile communications of data with standard protocols optionally encapsulated in a VPN. The processor is normally driven by a standard OS thereby making it possible to use the usual high-level languages (C, C++, Python, etc.) or the specific languages for artificial intelligence such as URBI (specialized programming language for robotics) for programming the high-level functions.

A card 120 is housed in the trunk of the robot. This is where the calculator which ensures the transmission to the cards 110 of the orders calculated by the card 130 is situated. This card could be housed elsewhere in the robot. But location in the trunk is advantageous since it is situated near the head and at the crossroads of the four limbs, thereby therefore making it possible to minimize the connection arrangements linking this card 130 to the card 120 and to the cards 110. The calculator of this card 120 is also an off-the-shelf processor. This can advantageously be a 32-bit processor of the ARM 9™ type clocked at 100 MHz. The type of the processor, its central position, close to the on/off button, its link to the control of the power supply make it a tool suitably adapted for managing the power supply of the robot (standby mode, emergency shutdown, etc.). The card also comprises a set of RAM and flash memories.

This architecture with three levels is particularly advantageous for the implementation of the present invention in which the robot must be able to execute coordinated movements and other actions such as readings of sensors and simultaneously interpret speech or signs emitted in its environment and react or respond thereto.

Figure 2A:
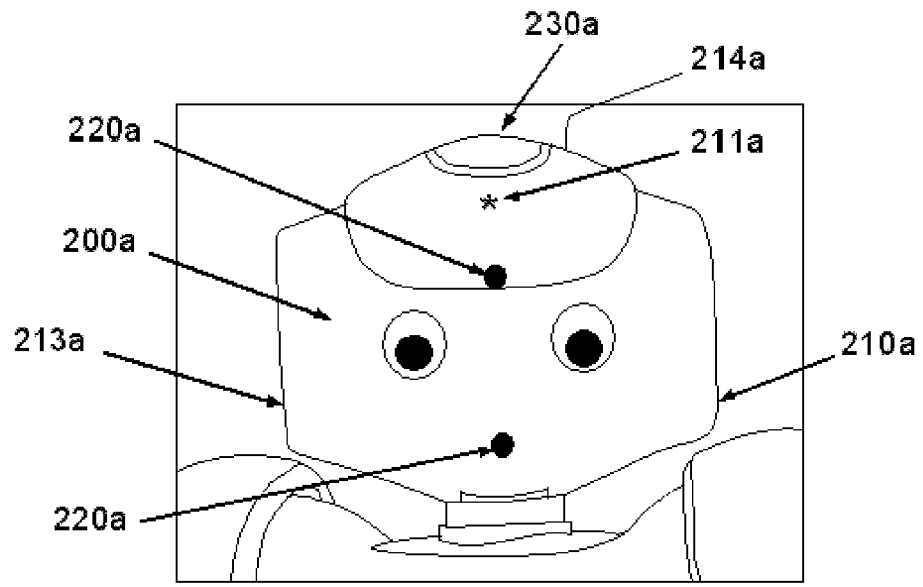
FIG. 2 illustrates the head of a humanoid robot comprising sensors useful for the implementation of the invention in several of its embodiments.
Figure 2B:
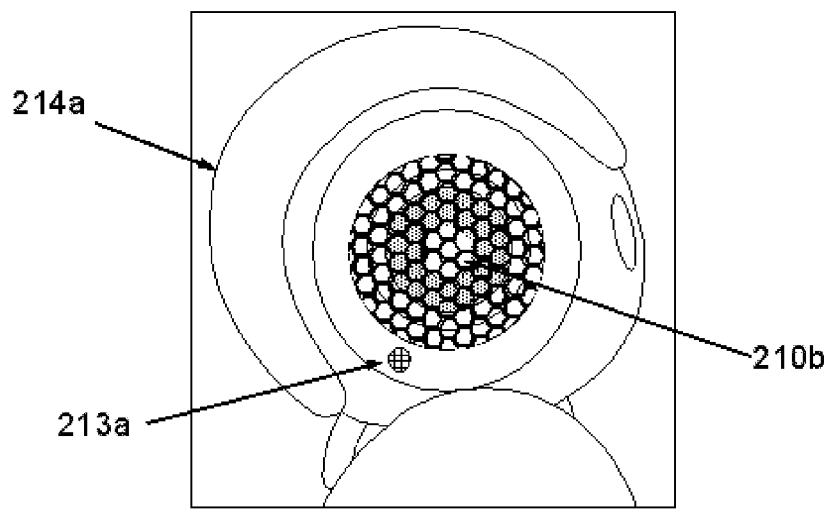

FIGS. 2a and 2b represent respectively an end-on view and a profile view of the head of a humanoid robot comprising sensors useful for the implementation of the invention in several of its embodiments.

The head 160 of FIG. 1 is improved as a head 200a, 200b, so as to equip the robot with sensory capabilities and capabilities for expressions which are useful for the implementation of the present invention.

NAO is equipped with 4 omnidirectional microphones 211a, 212a, 213a, 214a, for example referenced KEEG1540PBL-A supplied by Kingstate Electronics Corp, one 211a at the front, one 214a at the rear and one 212a and 213a on each side of its head (see also FIG. 2b), of which only the holes for access to the outside are visible in the figures since they are distributed inside the head. On the basis of the sound captures performed by the microphones, a voice analysis and recognition system, for example a system BabEAR™ supplied by the company Acapela™, recognizes a corpus of predefined words that a user having the appropriate interfaces, presented further on in the description, can enrich with his own terms. These words make it possible to trigger the behaviors of his choice, notably answers to questions interpreted by the robot. The software environment supports several languages, as indicated further on in the description. NAO is also capable of detecting the origin of a sound, thereby allowing it to resolve ambiguities between several interlocutors.

NAO sees through two CMOS 640×480 cameras, 220a, capable of capturing up to 30 images per second, for example cameras of the Omnivision™ brand, referenced 0V760 (CMOS $\frac{1}{6}^{th}$ inch sensor: pixels of 3.6 μm). The first camera placed at the level of the forehead, is pointed toward its horizon, whereas the second placed at the level of the mouth, surveys its immediate environment. The software makes it possible to retrieve photos of what NAO sees and also the video stream. To perceive and interpret its environment, NAO carries onboard a set of face and shape detection and recognition algorithms, which allow it to recognize its interlocutor, to locate a ball and also more complex objects.

Placed on the top of its skull, NAO is equipped with a capacitive sensor, 230a, divided for example into three sections and developed specifically by the applicant for this application. More than three sections could be provided for particular applications. It is thus possible to give NAO information by touch, for example by pressing a series of buttons allowing the triggering of actions defined by the application, which may be, within the framework of the present invention, different answers associated with each button, progress scrolling through a list of proposed choices, access to a help menu, etc. The system is accompanied by LEDs which indicate whether there is contact.

NAO can express itself by reading aloud any text file residing locally in its storage space, for example programmed according to the modes explained further on in the description or retrieved from a Web site or an RSS stream. Equipped with 2 loudspeakers, 210b, disposed on each side of its head, its voice synthesis system, for example Acapela Mobility from Acapela, is parametrizable, thereby allowing notably modifications of the speed and/or of the tone of the voice.

It is possible to dispatch a music file to NAO and make it play it. NAO accepts for example the _.wav and _.mp3 formats, thereby making it possible, within the framework of the present invention, to provide musical answers or customized sounds as accompaniment to or in substitution for voice answers. Other formats of music files may also be accepted.

Figure 3:
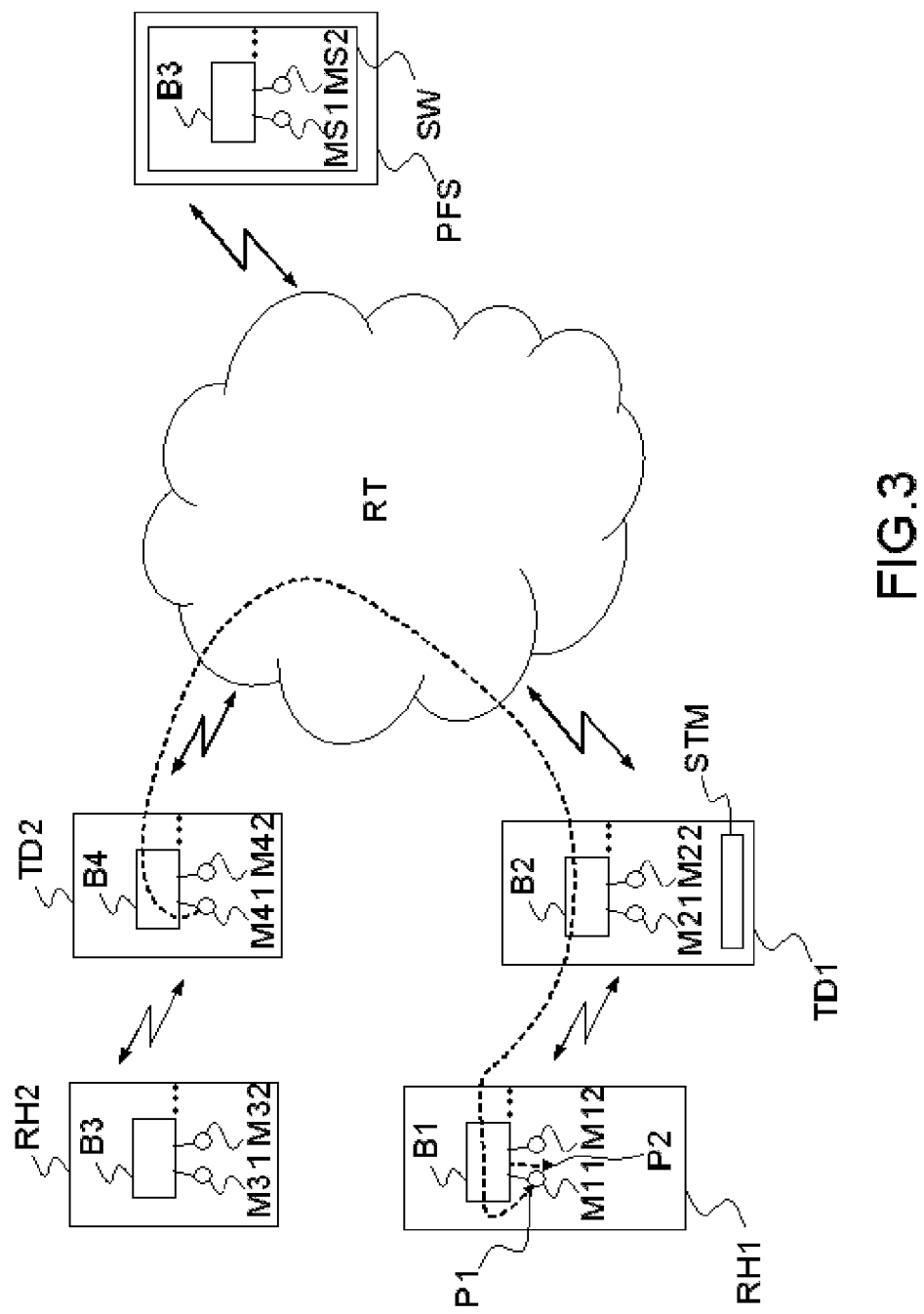
FIG. 3 is a diagram of the architecture of the high-level software allowing the control of the functions of the robot in several embodiments of the invention.

FIG. 3 is a diagram of the architecture of the high-level software allowing the control of the functions of the robot in an embodiment of the invention.

A software architecture of this type has been disclosed notably in patent application WO2009/124955 published on Oct. 15, 2009. It comprises the base functions for managing the communications between a robot and a PC or a remote site and for exchanging software which provides the software infrastructure necessary for the implementation of the present invention. This architecture is described hereinbelow in a generic manner, without specific mention of the software functions used in a specific application, it being understood that these functions are processed as any other software function for managing the behaviors of the robot of the present invention.

In FIG. 3 is very schematically represented a first humanoid robot RH1 communicating with a first remote terminal TD1, for example by wireless link for mobility reasons. The expression remote terminal is intended to mean a terminal remote from the server platform PFS, providing, by way of a communication network, access to a Web service SW, dedicated to this type of humanoid robot RH1.

Of course, the communication links between elements of the system may be wire-based, and the mobile terminals may be, as a variant, portable telephones or portable computers.

A second humanoid robot RH2 communicates with a second remote terminal TD2, for example also by wireless link so as not to impede the mobility of the humanoid robot RH2.

The remote terminals TD1 and TD2 and the server platform PFS are linked in a network by way of the communication network RC. For the Web service of the server platform PFS as well as for the remote terminals TD1 and TD2, and also for the humanoid robots RH1 and RH2, a single respective linkup module B5, B2, B4, B1 and B3 dedicated to at least one module comprising at least one series of instructions implementing a software function by execution by a processor. The respective modules M51, M52, M21, M22, M41, M42, M11, M12, M31, M32 of the linkup modules B5, B2, B4, B1 and B3 are in this example represented two in number per linkup module, but this number may be different and arbitrary for each linkup module.

We shall now illustrate a wholly non-limiting example of operation of the system envisaged by a user of the first remote terminal TD1 possessing the first humanoid robot RH1. He can, for example, carry out through his robot a certain number of functions by means of a software application onboard the first remote terminal TD1, or accessible on the server platform PFS from the first remote terminal TD1.

For example he carries out simply, by means of graphical tools of the software application, an application for his robot, in which the robot will walk for 10 seconds and then say "Hello everyone". This application is for example downloaded into the first humanoid robot RH1 in the form of a module, for example the module M11, and then triggered by the user by way of the first remote terminal TD1.

The first humanoid robot RH1 triggers the module M11 which must first use a "walk" function. The module M11 then uses a connection interface and function call module or proxy P1 which makes a request to the linkup module B1 to which the module M11 is linked. The linkup module B1 makes requests destined for its own modules and for the modules for linking up with the network to which it is directly linked (child linkup modules) which repeat this operation in an iterative manner, until a network linkup module responds to the request with the location of the function called that it has in a module. The response to the request also being transmitted in an iterative manner by the parent linkup modules (in the reverse direction) until the linkup module B1 directly linked to the proxy P1 needing to connect and to call this function. For example, the requested function for walking is located in the module M41 of the second remote terminal TD2. In return the linkup module B4 has returned the parameters of calls of the "walk" function, which, for example, contain a Duration parameter of integer type in seconds representing the duration for which the robot will walk, and an Exclusive parameter, of boolean type, representing the exclusive or non-exclusive walk of the robot, i.e. whether or not the robot is authorized to do another action while it is walking. In this example, the walk function is called with the Duration parameter being equal to 10 and the Exclusive parameter being equal to 1, since it is desired that it speak after having walked 10 seconds in this example.

The connection interface and call module P1 can therefore perform the connection and the call to the "walk" function with the desired parameters, remotely, as if it were situated locally. The connection interface and function calls modules use an intercommunication software capable of calling a function of a module located on a different terminal or server, it being possible for the function to be written by a series of instructions in a different computer language from that of the calling module. The proxies use, for example, the SOAP intercommunication software. This therefore yields an inter-platform and inter-language communication architecture.

Once this delocalized "walk" function has been performed, the module M11 must call upon a "speak" function. Another connection interface and function call module or proxy P2 makes a request to the linkup module B1 to which the module M11 is linked. The linkup module B1 makes a request destined for its own modules M11 and M12 initially, by way of a function carried out in the form of a string of stored instructions, which will, for example, return the presence of this "speak" function in the module M12. The linkup module B1 informs the connection interface and function call module P2 which can then call directly, by a call of local call type, the "speak" function of the module M12, with as parameter, for example, the text to be spoken "hello", this parameter having been transmitted to the proxy P2 by the linkup module B1.

Furthermore, the system comprises a storage and management module STM (diminutive of "Short Term Memory") for parameters representative of the state of the mobile terminal, in this instance of the humanoid robot RH1, which are adapted for updating the values of said parameters on receipt of an external event, and for informing a module, on prior request, of an updating of one of said stored parameters. Hence the forewarned module will be able to undertake an action as a function of the modifications of parameters of which it has been informed.

In conjunction with the example described previously, for example, the storage and management module STM can store the state of a parameter representative of the appearance of anyone detected by a motion detector of the robot RH1. When this parameter passes from a state representative of nobody in the immediate environment of the robot to a state representative of someone present in the immediate environment of the robot, on request performed previously by the module M11, the storage and management module STM forewarns, through an event or signal, this change of value. The module M11 can then, for example, automatically trigger the successive triggering described previously (the "walk" and "speak" functions).

In the example of FIG. 3, the storage and management module STM forms part of the remote terminal TD1, but, as a variant, it can form part of the other remote terminal TD2, of the server platform PFS, or of a humanoid robot RH1 or RH2.

The storage and management module STM is also capable of storing in memory a temporal evolution of certain parameters over respective reference time intervals. Thus, a module of the system can, furthermore, have access to the evolution of the values of these parameters from a certain duration, and take account of these evolutions in the actions to be taken.

As a variant, the modules of the functions called may be located on the server platform PGS, on a humanoid robot RH1, RH2 or on a remote terminal TD1, TD2 of the communication network RC.

Thus, the present invention makes it possible to have a program distributed over the network, and identical operation of the mobile terminal, whether it makes a local or remote call to a function.

Furthermore, the present architecture also makes it possible to have a set of stored parameters representative of the state of the mobile terminal, and to be able to take account of evolutions of this state so as to automatically trigger certain actions.

Moreover, the storage and management module can also record an evolution of values of parameters during a predetermined time interval, thereby allowing a module to have access to a log of the evolution of these parameters.

These communication and storage functions, which constitute an operating system for managing the interfaces of the robot, named NAOQI, are particularly useful for the implementation of the present invention.

Figure 4:
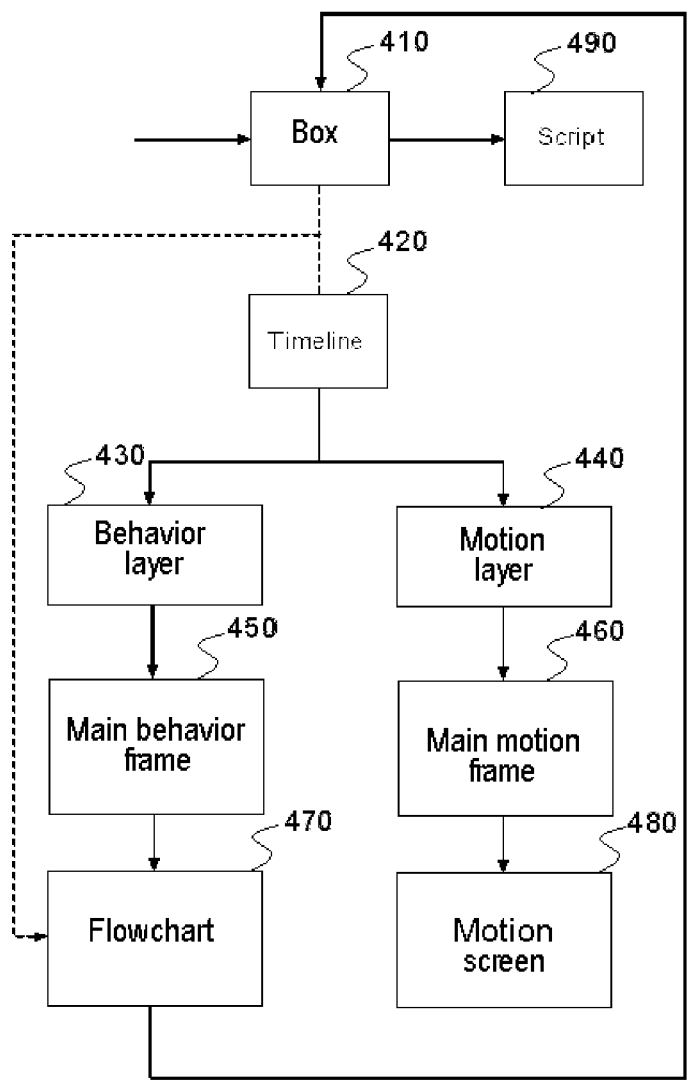
FIG. 4 is a diagram of the functional architecture for editing and programming the behaviors/interactions of a robot in several embodiments of the invention.

FIG. 4 is a diagram of the functional architecture for editing and programming the behaviors of a robot in an embodiment of the invention.

Such an architecture has been described by patent application PCT/EP2010/057111 filed on May 5, 2010. The software for editing and programming the behaviors of a humanoid robot making it possible to implement said architecture is commercially named Choregraphe™, and may be referred to either by its generic name or by its trade name, without adversely affecting the generality of the references.

The robot controlled by this architecture may be a humanoid robot having a head, a trunk and four limbs, each of the parts being articulated, each articulation being controlled by one or more motors. This architecture allows a user of the system to control such a robot by creating simulated behaviors on a virtual robot and executed on the real robot linked to the system by a wire-based or wireless link.

This entails viewing, simulating and executing behaviors (such as walk—straight ahead, right or left n paces; a "hello"—movements of one of the arms above the head; speech, etc.) and movements (of the head, of a limb part, of a given angle) on the screen of a computer programmed to do so.

FIG. 4 is a flowchart of the processing operations which illustrates the articulation of the controls triggered by events with their temporal dimension. The controls triggered by events are represented in the semantics of the invention by "Boxes" or "control Boxes" 410. A Box is a tree-like programming structure which can comprise one or more of the elements hereinbelow which are defined thereafter:

A "Timeline" or temporal axis of Frames 420;
A "Diagram" or Flow chart 470
A Script 490.

The control Boxes are normally linked together by connections which usually transmit an event information item from one Box to another, as detailed further on in the description. Any Box is linked directly or indirectly to a "Root box" or Root which initializes the behavior/movement scenario of the robot.

A temporal axis of Frames 420 represents the temporal constraint to which the robot's behaviors and movements, defined in the Box in which said temporal Axis of Frames is inserted, are subjected. In the subsequent description and claims, we will use the term Timeline, commonly admitted with the same meaning in the world of programming. The Timeline thus carries out the synchronization of the behaviors and movements of the Box. It is cut up into Frames with which is associated a speed of progress defined in terms of number of Frames Per Second (FPS). The FPS of each Timeline is parametrizable by the user. By default, the FPS may be fixed at a given value, for example 15 FPS.

A Timeline can comprise:
One or more behavior Layers 430, each comprising one or more Behavior Key Frames or "main behavior Frames" 450, which can themselves comprise one or more Diagrams or "Flow charts" 470, which are in fact sets of Boxes which can also be attached directly to a higher-level Box, without passing through a Behavior layer or a Timeline;
One or more motion Layers 440, each comprising one or more Motion Key Frames or "main motion Frames" 460 which can comprise one or more Motion Screens 480.

A behavior Layer defines a set of behaviors of the robot or main behavior Frames. Several Behavior layers may be defined within one and the same Box. They will then be programmed to proceed in a synchronized manner by the Timeline of the Box.

A Behavior layer will be able to comprise one or more main behavior Frames. A main behavior Frame defines a behavior of the robot, such as walk ("Walk"), speech ("Say"), play music ("Music") etc. A certain number of behaviors are preprogrammed in the system of the invention so as to be directly inserted by the user in a simple "drag and drop" from a library as detailed further on in the description. Each main behavior Frame is defined by a trigger event which is the start of the Frame at which it is inserted into the Timeline. The end of the main behavior Frame is defined only insofar as another main behavior Frame is inserted following it, or if an end event is defined.

A motion Layer defines a set of motions of the robot which are programmed by one or more successive main motion Frames which group together movements of the motors of the articulations of the robot. These movements to be executed are defined by the angular positions of arrival of said motors which may be programmed by action on motion screens, said actions being detailed further on in the description. All the main motion Frames of one and the same Box are synchronized by the Timeline of the Box. A main motion Frame is defined by an arrival Frame. The start Frame is that of the end of the previous main motion Frame or that of the start event of the Box.

The main behavior Frames and the main motion Frames are referred to by the common name of main action Frame.

It is possible to execute in parallel several main action Frames (of behavior or of motion), on condition that they are attached to the same Timeline.

A Flow chart is a set of Boxes connected together, as detailed further on. Each of the Boxes can in its turn comprise other Timelines to which are attached new behavior or motion Layers.

A script is a program directly executable by the robot. Within the framework of the present invention, the scripts are in a favored manner written in the C++ language. A Box which comprises a script does not comprise any another element.

The software may be embedded on a PC or another platform of personal computer type using a Windows™, Mac™ or Linux™ operating system.

The humanoid robot of the present invention will generally be programmed to be able to interact with a human being by using the Choregraphe™ software. The combination of the temporal and behavioral logic rendered possible by this development architecture is particularly advantageous for the implementation of the present invention. A certain number of tools, mentioned subsequently further on in the description, have been particularly developed for the implementation of a humanoid robot having an interface for natural dialog within the framework of the present invention.

Figure 5:
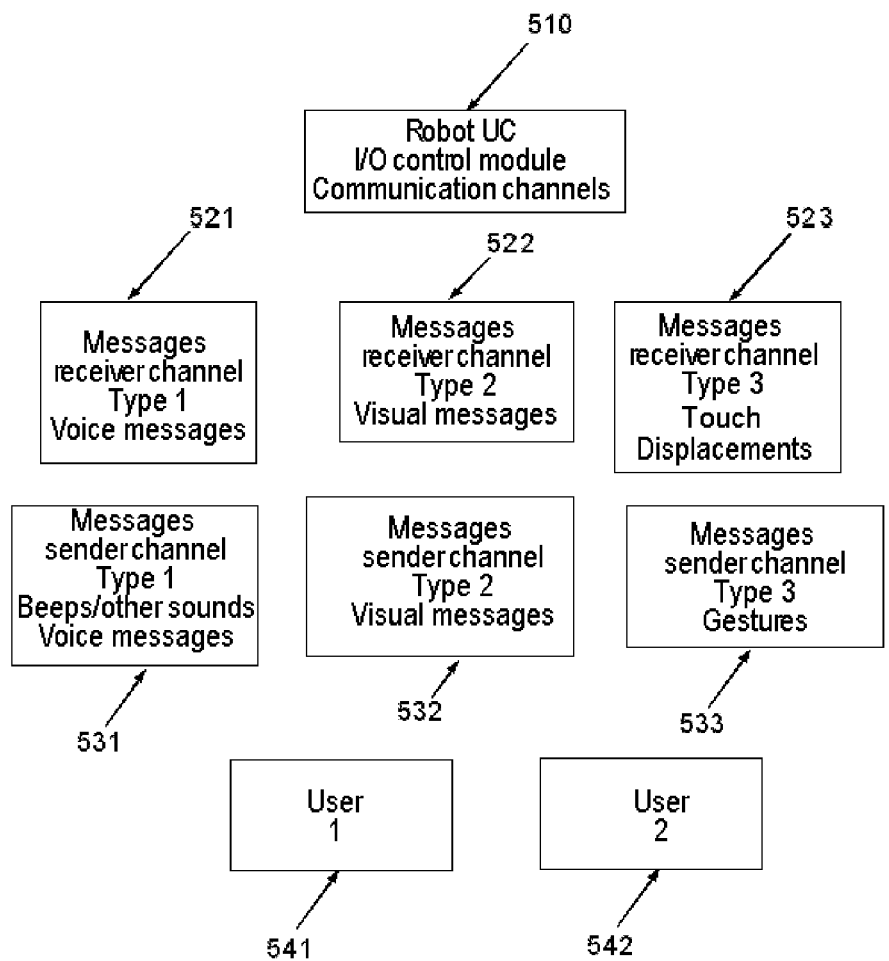
FIG. 5 is a functional flowchart of the processing operations applied in a general manner to improve the interpretation given by a humanoid robot of the response/stimuli that it receives in several embodiments of the invention.

FIG. 5 is a functional flowchart of the processing operations applied in a general manner to improve the interpretation given by a humanoid robot of the response/stimuli that it receives in several embodiments of the invention.

Over time, human beings have developed a large variety of means for interacting with machines. These means follow the evolution of the technologies, they are therefore ever more efficacious. In all cases, to be effective, the interaction, whatever it be, must be adapted to the platform and to the needs of the user.

Graphical interfaces and windowed environments thus place at the disposal of a user a certain number of interface elements also called graphical interface components (GUI Elements or Graphical User Interface Elements), such as for example: text area (Text Box), OK/Cancel buttons, boxes to be ticked (Check Boxes), radio buttons, or combined boxes (Combo Boxes). These elements, adapted to a graphical interface, cannot be used as such on a humanoid robot which does not in principle provide any visual feedback of traditional screen type. Now, the exchanges with the robot ought to be at least as rich as those with the graphical interface of a computer. One then wants to be able to choose an option, spell a word, run or leave an application in the same way that one would tick a box, that one would enter a text on the keyboard, that one would double click on an icon or that one would click on the cross in the window of the application. Neither does one want simply to copy these existing elements, precisely because one wants a humanized and natural interface for the user. It is therefore necessary to find user interface elements which are adapted to an autonomous humanoid robot.

These elements must also be easily parametrizable for the creators of humanoid robot behaviors and allow easy adaptation to the language of the user. The existing autonomous robots can put in place simple man-robot interfaces, such as voice recognition, but, in the prior art, neither users nor developers have been provided with any multimodal user interface element which is regionalized (allowing multilingualism) and which manages failures.

Indeed, today, the type of voice recognition that it is possible to embed in a humanoid robot of reasonable size and price, equipped with multi-sensor acquisition and processing capabilities, with locomotion capabilities and with a large number of degrees of freedom of its four limbs, is necessarily limited by the computer resources and electrical energy resources that it is possible to carry onboard the robot. These resources are indeed necessarily assigned by priority to the processing operations making it possible to ensure safety and reliability of the captures of signals and controls necessary for the execution of movements. It is therefore necessary to provide man-robot interface elements allowing the best possible correction of the inevitable imperfections, in this context, of the voice recognition and to offer the user successful interaction by virtue notably of mechanisms for resolving doubt about the interpretation given by the robot to the messages that it receives from the user and questions returned by the robot which come within the framework of a dialog sequence which converges.

It will also be noted that a human does not speak in a natural manner to a robot because he does not get back his human references, that is to say the gestures and behaviors that a human would have in the same situation. The interaction will notably not be natural if the robot does not look in the direction of the human, a customary interaction in Man-Man interaction. Moreover, in contradistinction to human communication, the type of voice recognition compatible with the computer resources onboard a multifunction humanoid robot does not by itself allow effective management of interactions with several users. Furthermore, most robots use little or no natural language, voice synthesis being in general programmed with phrases prewritten by humans, be they a story invented for the robot or an email written by a human and which the robot will read. It therefore lacks elements enabling Man-robot interaction to be made as close as possible to Man-Man interaction. The man-robot interfaces of the prior art do not have enough multi-modality or interaction codes making it possible to simulate a Man-Man natural interaction and to contribute to the success of the interaction. Moreover, if the interface calls upon knowledge already acquired by the user and even that which he uses daily, the experience will be much easier and will require only little learning on the part of the user. Thus, scanning one's eyes across a room in a virtual world will be done all the more instinctively with a virtual reality helmet by moving the head than by pressing the arrows on a computer keyboard.

The solution of the invention proposes user interface elements, combining software and hardware, adapted to an autonomous humanoid robot. By transposing the term GUI Elements used hereinabove to the behaviors of a robot, one then defines BUI Elements (Behavior User Interface Elements), that can be referred to here more generally and simply as UIElements. Such UIElements can for example be defined so as to code in a simple manner actions such as:
  quit an application at any moment by tapping simultaneously on the three tactile sensors of the robot's head;
  interrogate the robot using voice recognition;
  pass to the next step of an application by tapping on one of the robot's tactile sensors.

These simple elements are thus true interaction codes which may be embedded in generic libraries so as to be available in all the behaviors and applications of a robot or created in the guise of specific resources of a given project.

The UIElements of the invention are elements that can be used and parametrized easily by a behavior developer. It is mainly Choregraphe boxes which become basic GUI Elements for programming behaviors. Notably, some of these boxes comprise Choregraphe plugins coded in C++ using a Widget library produced by the Qt™ environment for developing graphical interface components.

A simplified view of a functional architecture allowing the implementation of the invention has been represented in FIG. 5.

A control module for the inputs/outputs 510 of the communication channels through which the robot will exchange its messages with its interlocutors is rigged up within or in connection with the central unit 120 of FIG. 1. This module comprises, physically or logically, the means of send/receive preprocessing of the specialized communication channels with which the robot is equipped.

Without this being limiting, three types of message communication channels have been represented in the figure, each type having a receive channel and a send channel.

A receiver channel 521 of type 1 corresponds to human hearing and allows a robot to acquire sound signals, preferably voice messages with semantic content. Accordingly, the robot may be equipped with the microphones 210a represented in FIG. 2a. The outputs of this channel are normally preprocessed by a specialized signal processing processor which executes voice recognition algorithms. These algorithms may be more or less complex and of variable effectiveness depending on the environment in which they are used (ambient noise, multiple talkers etc.) and the implementation of more or less complete specific learning. In all the configurations, recognition errors are inevitable however.

A sender channel 531 of type 1 corresponds to human speech and allows a robot to speak, that is to say to pronounce voice messages with semantic content, for example by way of loudspeakers 210b represented in FIG. 2b. The language, the timbre, the rhythm and the tone of the voice may be varied as a function of the context and to express feeling. But these sounds can also be beeps, prerecorded music, it being understood that beeps, in a Morse sequence for example, and music, according to pre-established codes, can also have a semantic content.

A receiver channel 522 of type 2 corresponds to human vision and allows a robot to map its environment and to acquire images that it can then recognize if they are stored in a memory which is accessible to it. Accordingly, the robot may be equipped for example with the CMOS cameras 220a represented in FIG. 2a. One of the cameras is preferably dedicated to far vision, the other to near vision. Advantageously, the image recognition algorithms are adapted to allow detection or indeed recognition of the faces of the robot's interlocutors. Here again, whatever the recognition performance, uncertainties or errors are inevitable. Image recognition can also apply to simple shapes such as numerical digits presented to the robot on VDUs or brand marks, whose meaning may be defined by a coding.

A sender channel 532 of type 2 is an artificial channel with no direct human equivalent. This channel allows the emission of light signals produced by LEDs embedded in the robot's body. Numerous LEDs may be provided, notably on the eyes, the ears, the torso, the feet. They can have different colors and be equipped with a variable-frequency blinking capability. This channel equips the robot with simple and powerful means for dispatching messages. In particular a particular code may be defined and programmed by a user.

A receiver channel 523 of type 3 is a channel equivalent to human touch. This channel is however limited in its tactile areas. The latter may for example be concentrated in a tactile sensor such as the sensor 230a represented in FIG. 2a. The robot's interlocutor will actuate the tactile sensor to communicate a message to the robot, of binary (validation of an action) or more complex type. The information received by this channel can indeed correspond to a code defined by the user, either unitary (smack, stroke having a meaning of punishment and reward respectively), or sequential of Morse type. A specific tactile sensor is not absolutely necessary for defining a communication channel of this type. A channel of the same type, insofar as it receives an interlocutor's contact action, may be defined in which the message sensor is a continuous analog sensor represented by the positions of the robot's arms and/or forearms, said positions being representative of numerical values communicated by the interlocutor to the robot, as will be explained subsequently further on in the description. Indeed, at any instant the robot is aware of the angular positions of its articulations and therefore knows how to interpret as a message variations of the latter caused by a displacement under the action of the interlocutor, if the meaning of said displacement has been defined in advance. A simple touch of a limb (the forearm for example) can also be discerned by the sensors of angular position of the articulations of the robot. More abrupt movements, such as jolts or a lifting may be detected respectively by the robot's inertial unit and its soles-of-feet sensors (FSR).

A sender channel of type 533 of type 3 is equivalent to human gesture. The head may be endowed with two degrees of freedom: displacement in azimuth, measured by an angle of yaw and displacement in elevation, measured by an angle of pitch. These two movements traditionally define messages of approval (pitch) or of denial (yaw). They also allow the robot to direct its gaze toward the interlocutor with whom it is in conversation. The articulations of the shoulders, elbows, wrists may be equipped with the following degrees of freedom respectively: pitch and roll (roll or right/left torsion); yaw; yaw. The hand may be equipped with opening and closing capabilities. Combinations of the movements of these articulations make it possible to define the content of messages to be communicated to the robot's interlocutors through this channel.

Other message communication channels, not represented in the figure, exist or can also be defined. In particular, the robot can receive and send signals by infrared, Bluetooth or Wifi link. It is therefore possible for an interlocutor to transmit messages to the robot through this channel, notably by using a remote control programmed for this purpose, for example an iPhone™ from Apple™ or another telephone having motion capture and/or positioning functionalities.

Likewise a robot can dispatch messages to another robot via these communication ports.

According to the invention, a message communication channel may be defined by merging different type channels into a channel of hybrid type. Thus, the outputs of a sound channel equipped with speech recognition and of a visual channel equipped with image recognition may be combined to create a new channel whose outputs will be improved by a process of data merging, the output on output from this channel being a priori of a higher confidence level than those of the two outputs taken separately.

Two interlocutors 541 and 542 of the robot are also represented in FIG. 5. Naturally, just one or more than two interlocutors are possible in the implementation scenarios of the invention. Furthermore the interlocutors may be situated some distance from the robot, on condition of being linked to the room where the robot is situated by data links making it possible to transmit the audible and/or visual signals necessary for the exchanging of messages. Naturally, in this case, the use of the communication channels of type 3 which require physical contact will not be possible.

The relative position of the robot with respect to its interlocutor(s) and with respect to its environment can also be measured by particular sensors (voice recognition associated with interlocutor location; recognition of images; ultrasound sensor, etc.) and be interpreted, cross-referenced for example with an analysis of volume, tone or expression so as to characterize the nature of the man/robot dialog and optionally modify its progress. Thus, an interlocutor who approaches and speaks loudly may be viewed by the robot as a threat and trigger various protective behaviors, with associated body language, or indeed modification or interruption of the interactions.

The logical control of the inputs/outputs of these various communication channels is performed by module 510.

The latter makes it possible at one and the same time, as explained further on in the description, to resolve doubts about the inputs of a receiver channel of a first type (for example sound channel), through messages sent on a sender channel of the same first type, said doubt resolving actions possibly being performed in response by the interlocutor on a channel of the same first type or on a receiver channel of a second type (for example tactile channel). The messages requesting resolution of doubt about a message received on a channel of a first type (for example sound channel) can also be sent on a channel of a second type (for example visual channel, by LED sending), the interlocutor's doubt resolving action having to be performed on a receiver channel of a third type (for example tactile channel). These combinations are given purely by way of nonlimiting illustration, a great variety of combinations being possible.

The control module for the inputs/outputs of the communication channels 510 can also be used more simply to combine inputs of messages, this combination making it possible to remove practically any possibility of doubt in "the mind" of the robot.

The programming of the function for combining the inputs received by a receiver channel and the outputs sent by a receiver channel may be carried out in a simple manner by using BUIElements.

We shall describe further on a type of BUIElement consisting of a control Box of Choice type or Choice Box. The latter represents a way of making a choice from a closed list. It is especially adapted to the recognition of a restricted number of words and phrases, within the framework of a dialog, the robot being able to pose a question before listening to the user's choice.

We describe hereinbelow a distinct type of BUIElement from a different type of a Choice Box.

We illustrate this modality with the example of choosing an integer number. For this element, the robot for example states on its sender channel of type 1, 531, the minimum number and the maximum number available to the user, and stretches one of his arms out to its interlocutor, the former being weakly servocontrolled. This arm will constitute the receiver channel 523 of type 3 of FIG. 5. The low position of the arm is associated with the minimum digit, the high position with the maximum digit. The user thus uses the robot's arm as a cursor to choose his digit. The robot knows the position of its arm by virtue of the feelers available on the pitch articulation of the shoulder (ShoulderPitch). To augment this interaction, the robot looks at its hand while the user is moving its arm. With each change of position, the robot can state the chosen digit. The user can validate his choice by touching the tactile sensor in the middle of the robot's head, using another receiver channel 523 of type 3. Provision may also be made, notably in the case of too large a number of digits with respect to the accuracy of the sensors, for one arm to allow a coarse adjustment to be made, and for the second to choose more accurately. Ordered lists of expressions may be represented by numbers. The above procedure then becomes a modality of choice from a dropdown menu announced by the robot.

A variant making it possible to choose a digit consists in using the tactile sensor alone. For example:

Tapping on the fore sensor makes it possible to descend one notch in the list of digits;

Tapping on the aft sensor makes it possible to advance through the list of digits;

Leaving the fore or aft sensor pressed makes it possible to accelerate the scrolling through the list of digits;

The choice would be made by touching the middle sensor. It is seen that it is possible to significantly vary the possible combinations as a function of the scenarios of use of the invention.

Figure 6:
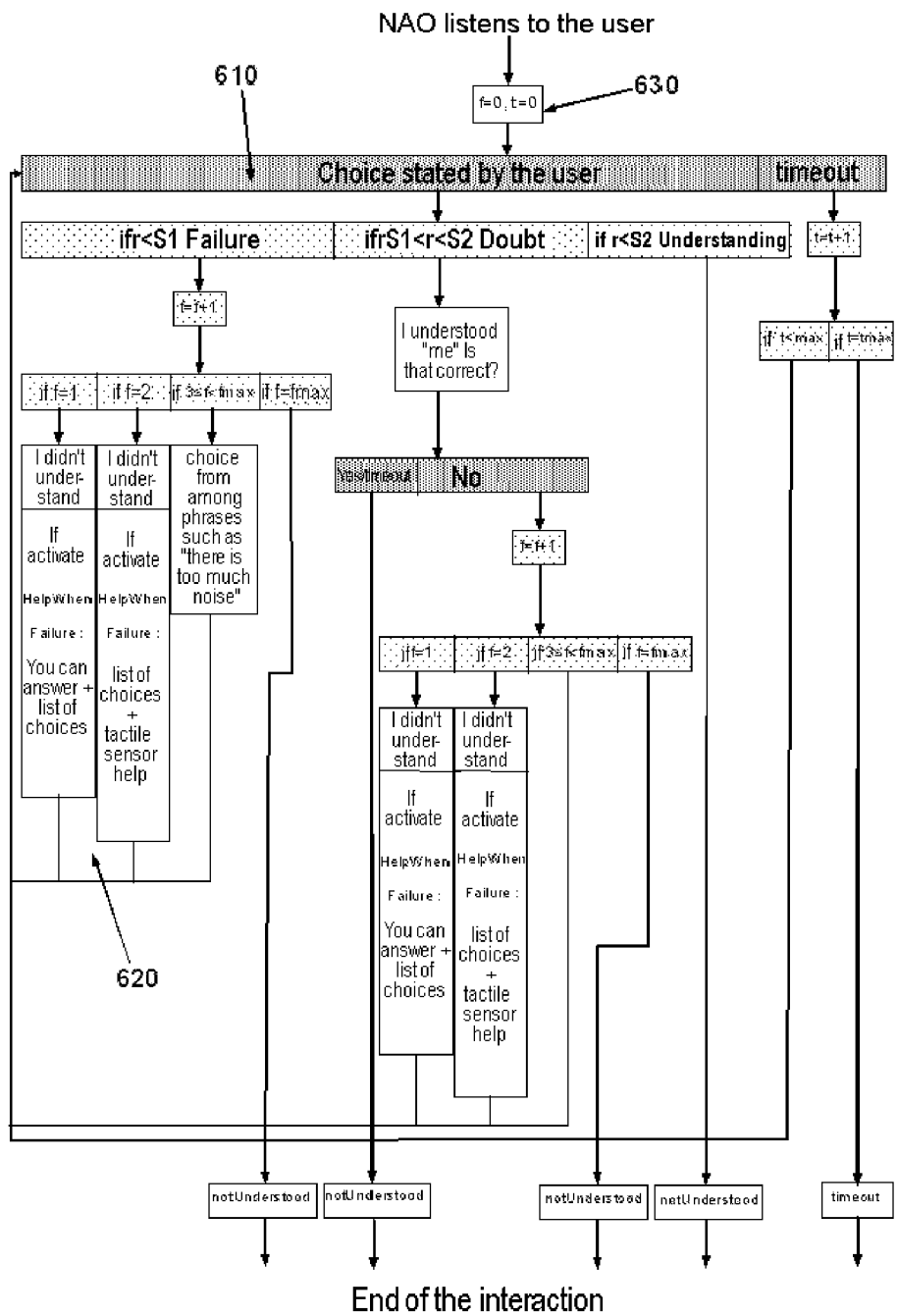
FIG. 6 is a programming logic chart for the behaviors/interactions of a robot in several embodiments of the invention.

FIG. 6 is a programming logic chart for the behaviors/interactions of a robot in several embodiments of the invention.

The example illustrated by the figure is a scenario where a robot dialogs with an interlocutor who offers it a choice from a list of words, for example in the case of a game of conundrums. In this scenario, a receiver channel of type 1, a receiver channel of type 3 and a sender channel of type 1 are used.

The actions represented by the code 610 in the figure are actions of an interlocutor of the robot: choice stated by the user from a list for example previously stated by the robot; timeout (or absence of choice); "yes/no" answer to a request for confirmation of understanding of one or more words in this list.

The actions represented by the code 620 in the figure are robot actions which will be activated as a function of the state of the internal variables represented by the code 630. The meaning of these internal variables is as follows:

r: rate of probability of recognition by the robot of the word stated by the user from among those of the list of choices;

f: aggregate number of recognition failures;

t: number of timeouts (or absence of choice by the interlocutor after a predefined time);

S1: threshold 1 of recognition probability rate;

S2: threshold 2 of recognition probability rate;

tmax: maximum number of possible timeouts;

fmax: maximum number of possible failures.

The general way in which the timeouts are processed corresponds to the application to the problem posed of a simple principle of daily human life: "Whoever does not say a word consents . . . "

The general logic of the processing operations represented in this figure is described hereinbelow.

NAO listens to the user/interlocutor and the variables f and t are initialized to zero. If the interlocutor allows the predetermined timeout time to pass, the timeouts counter is incremented and if the maximum number of timeouts is reached, the interaction loop is interrupted.

This application may be initialized either in a behavior in a deterministic context where a specific action done by the user will trigger it such as an interrogation of the robot, in a game to ascertain the number of players when it is started or by pressing one of the tactile sensors on the head, or in the context of an artificial intelligence which will trigger it as a function of parameters such as the detected presence of a human being, the time of day or more generally, the log of the day's events, which is stored by the robot. For example, if it detects that the user is calling it, it triggers an application allowing it to know what the user wants of it and why he has called it. In another context, it will itself be able to trigger an application to propose a game if it detects the presence of a human, that it has a great desire to play and that it is a long time since it has played.

If the interlocutor states a choice before the expiry of the timeout, the measured recognition probability rate r is compared with thresholds S1 and S2 (S1<S2), of expected recognition probability rates, the way in which these are determined being described further on.

If r≤S1, this recognition of the word is considered to be a failure. The failures counter is incremented. If fmax is reached, the word is declared definitively unrecognized and the interaction is interrupted. If fmax is not reached, provision may be made, as illustrated in the figure, for three cases:

at the first failure (f=1), the robot indicates to its interlocutor "I didn't understand" and activates that one of the functions "activateHelpWhenFailure" consisting in repeating the list of choices;

at the second failure, (f=2), the robot also indicates "I didn't understand" and activates another of the functions "activateHelpWhenFailure" consisting in providing its interlocutor with the list of choices and in asking its interlocutor to use its tactile sensor, showing him how to use it;

beyond (3≤f<fmax), the robot can pronounce phrases indicating to its interlocutor that the conditions of an effective conversation are not fulfilled, such as "there is too much noise", which will normally prompt said interlocutor to end the conversation.

If S1<r≤S2, the robot has a doubt as to what it actually heard; according to the procedure represented in the figure, it can then undertake an action to resolve the doubt, by pronouncing the word or the expression that it thinks it recognized and by asking its interlocutor "Is that correct?"; if the interlocutor answers "yes" or does not answer at the end of the timeout, the robot considers that the answer is right. If the interlocutor answers "no", the failure counter is incremented; if fmax is reached, the robot indicates definitively that it did not understand and the interaction stops; if fmax is not reached:

at the first failure (f=1), the robot can activate that one of the functions "activateHelpWhenFailure" consisting in repeating the list of choices;

at the second failure (f=2), activates another of the functions "activateHelpWhenFailure" consisting in providing its interlocutor with the list of choices and in asking its interlocutor to use its tactile sensor, showing him how to use it;

onward of the $3^{rd}$ failure and up to fmax, the interlocutor must repeat the choice until the rate of probability of recognition improves.

In this way, it is thus possible to greatly alleviate the imperfections of the voice recognition and to create improved fluidity in the conversation between the robot and its interlocutor.

Figure 7A:
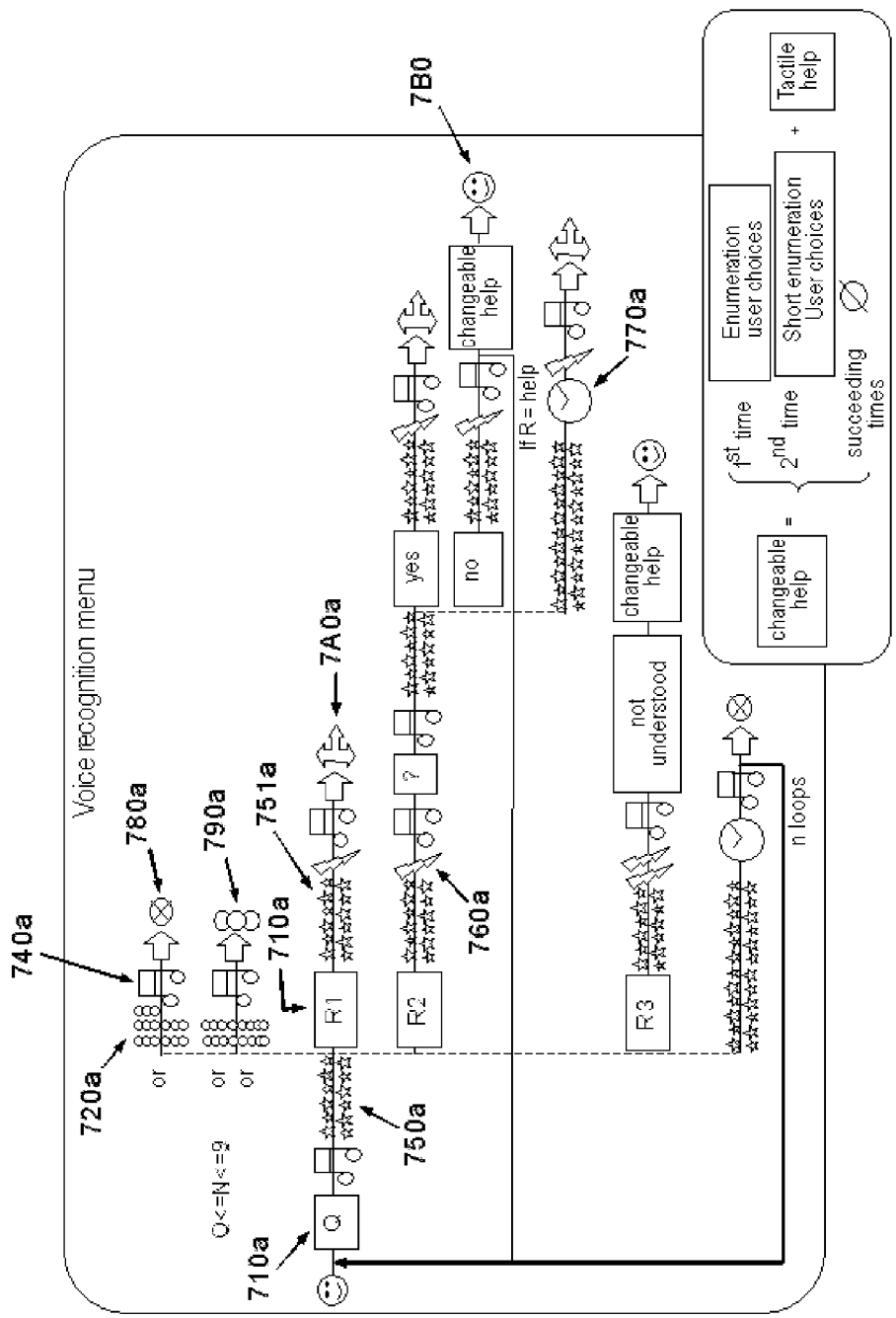
FIGS. 7a, 7b and 7c represent timecharts illustrating the logical and temporal combination of the interactions of a multimodal interface in several embodiments of the invention.
Figure 7B:
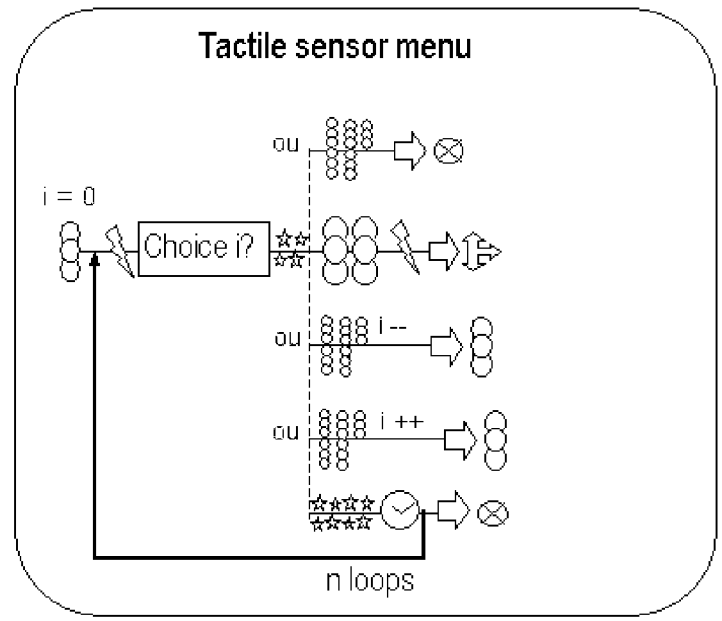
Figure 7C:
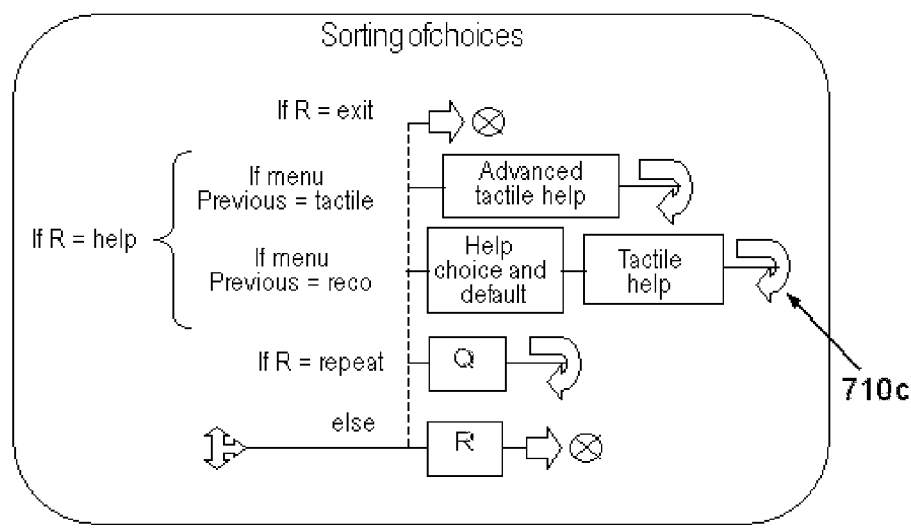

FIGS. 7*a*, 7*b* and 7*c* represent timecharts illustrating the logical and temporal combination of the interactions of a multimodal interface in several embodiments of the invention.

These figures are views of the Choice Boxes making it possible to program the interactions of the type of that represented in the chart of FIG. 6.

The Choice Boxes are Boxes such as those illustrated under the rubric 410 in FIG. 4, but they are of a particular type allowing the particularly effective programming of specialized behaviors for natural dialog.

The meanings of the symbols in these figures are as follows:

in FIG. 7a,
- 710a designates the actions/speech of the robot or of its interlocutor;
- 720a designates the tactile sensor;
- 740a designates a recognition beep;
- 750a designates the LEDs of the robot's face in the rotating animated position;
- 751a designates the LEDs of the robot's face in the fixed position;
- 760a designates the flash of the LEDs of the robot's face (which may be of various colors as a function of the understanding by the robot of the message received);
- 770a designates the timeout function;
- 780a designates the output of the Choice Box;
- 790a designates the function "Go to the tactile sensor menu" (FIG. 7b);
- 7A0 designates the function "Go to the sorting of the choices" (FIG. 7c);
- 7B0 designates the function "Go to the voice recognition menu";
- R1, R2 and R3 designate respectively a case where the robot understands without ambiguity, a case where the robot understands but has some doubt and a case where the robot does not understand at all;
- In FIG. 7c, 710c designates the function "Return to the previous menu".

The general logic of the processing operations programmed in the Choice Box is identical to that already described. The additional elements described here are:
- The use of the LEDs 750a of the robot's face, optionally of the LED flash to punctuate the exchanges of questions and answers: the LEDs are in the fixed position 751a to indicate that the robot is detecting speech and analyzing it;
- The use of an audible "beep" emitted by the robot to indicate the moment at which it is ready to recognize; indeed, because of the limitations in processing capacity and in power supply, and also to avoid noisiness in recognition, the latter is not active at the same time as voice synthesis; it is therefore not necessary for the questions posed by the robot to the interlocutor to be answered too early by the latter; the "beep" gives the pip to begin answering;
- The possibility of using several levels of help which depend on the historical log of the robot and its experience of this user in the course of this exchange and the previous exchanges;
- The possibility of navigating between several menus to facilitate programming.

The figures which are now described are screenshots on which a Choice Box component of the Choregraphe software described as a comment to FIG. 4 hereinabove is used to program simple or complex interactions between an NAO robot and an interlocutor by using in the examples represented receive and send channels of type 1 (voice exchanges).

Figure 11A:
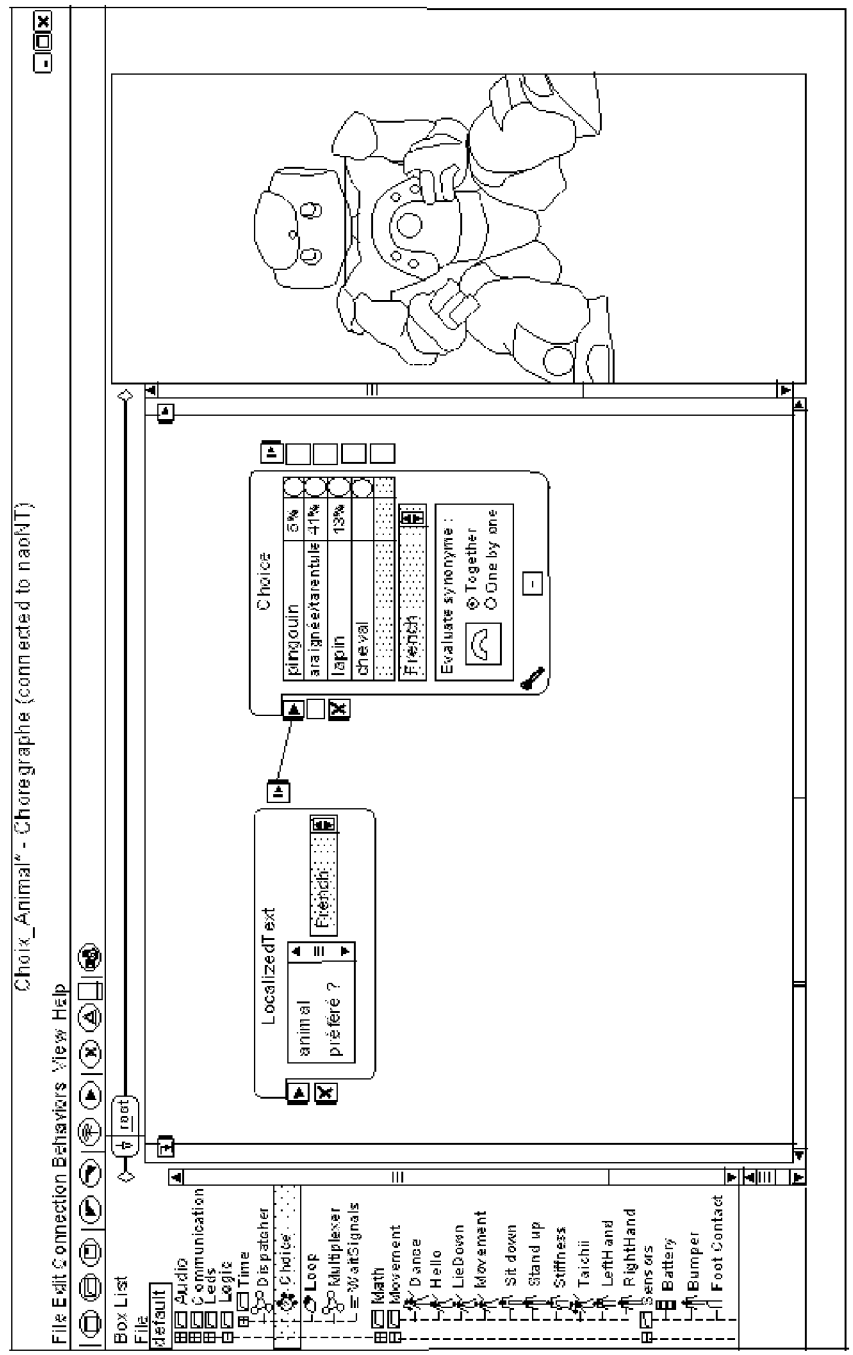
FIGS. 11a and 11b represent a sequence of screens making it possible to replace or supplement options of a list of choices and to execute a new voice recognition test comparing between several options in an embodiment of the invention.
Figure 11B:
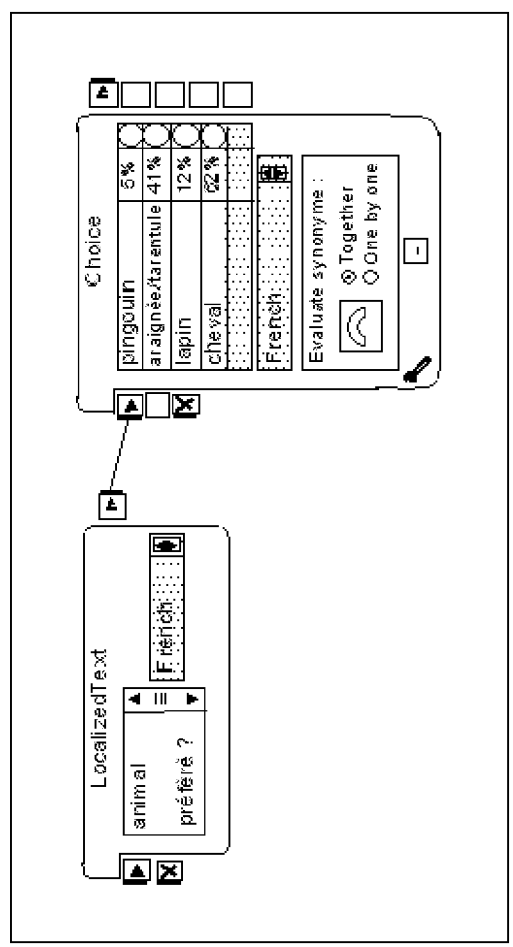

FIGS. 8a, 8b, 8c, 8d and 8e represent a sequence of screens making it possible to program a dialog with a humanoid robot with binary choice and option for changing the interaction language in an embodiment of the invention;

FIGS. 9a, 9b, 9c, 9d and 9e represent a sequence of screens making it possible to program a dialog with a humanoid robot with choice from a list and option for changing the interaction language in an embodiment of the invention;

FIGS. 10a, 10b, 10c and 10d represent a sequence of screens making it possible to execute a voice recognition test comparing between several options of a list of choices in an embodiment of the invention;

FIGS. 11a and 11b represent a sequence of screens making it possible to replace or supplement options of a list of choices and to execute a new voice recognition test comparing between several options in an embodiment of the invention;

FIGS. 12a, 12b, 12c and 12d represent a sequence of screens making it possible to execute a voice recognition test comparing between several options of a list of choices in a different language from that of the question in an embodiment of the invention;

FIGS. 13a, 13b, 13c and 13d represent a sequence of screens making it possible to verify/modify the thresholds of the voice recognition tests comparing between several options of a list of choices in an embodiment of the invention.

Generally, a Choice Box allows a user to choose an answer from among a predefined set of choices. It calls upon a component of table type which allows a developer to write his set of possible choices in an intuitive and readable manner. The list of choices can also be entered as input to the box, if the developer does not know it in advance. Thus, for example, in the case of an application managing the user's mails, the robot will be able to make him choose a contact from his address book stored in a separate file. These UIElements are highly parametrizable tools. The UIElements using voice recognition and/or synthesis are thus regionalized. For example, the Choice Box is editable in French and in English. At the graphical interface level for the programming thereof, the Widget Qt™ used to change the language for editing the box may be a ComboBox.

The inputs (and outputs) of the Choregraphe boxes may be of several types:
1. "bang": a signal is dispatched
2. number: the input retrieves a number, integer or floating
3. string: the input retrieves a character string
4. dynamic.

An input (respectively output) of dynamic type retrieves (respectively outputs) an ALValue.

The ALValues are a union of common types, described in a NAOQI library, notably: integers, floating, array, boolean, string, and also "bang", which is an uninitialized ALValue. The inputs of dynamic type make it possible to manage the evolutions of an application in a very flexible manner. In particular the choice of the inter-modality and/or intra-modality confirmation modes, the presentation of aids are provided to the robot's interlocutors to activate them can depend on the number of possible choices.

Thus, it is possible to enter a python table (array type) as input to a Choregraphe box on condition that this input is of dynamic type.

The Choregraphe software used to implement the invention comprises parameters of boxes of boolean type (Check Box), character string type (Text Box), multiple choice of character strings type (Combo Box) that are editable or not by the end user, integer number or floating floating type (Slider), or other type. For example, the programmer who uses the Choice Box in his behavior or application has the possibility of ticking or unticking the boolean parameter "Repeat validated choice" (in French, "Répéter le choix validé"). This will have an effect on NAO's behavior during the interaction since it defines whether or not NAO systematically repeats the choice validated by the user.

To alleviate the deficiency of the voice recognition, a diagnosis tool makes it possible to maximize the success of the voice interaction. Thus, in the Choice Box, when the developer has finished writing his list of words in the table, he can run this tool which will indicate a percentage recognition of these words, 100% corresponding to a word which will certainly be recognized by the robot, 0% to a word that the robot will not recognize. This diagnosis is performed by comparing the word said by the voice synthesis (which is assumed to be close to what the user will say) and the word expected by the voice recognition. Moreover, so as to maximize the chances and the naturalness of the interaction, for each choice, several expressions can be defined. Thus, to ask the robot to send a mail, the developer will be able to place several phrases such as "send a mail", "send a message" or "send an email" at the user's disposal. The user will thereafter have the choice between these various expressions so as ultimately to say the same thing.

The solution of the invention also makes it possible to solve the problem of a voice recognition which does not manage the presence of several users. Humans appreciate that when speaking to several people, communication is difficult, therefore they adapt by speaking one by one. This situation is facilitated by the existence of clearly single-user interaction codes, such as the use by the robot of the familiar French "tu" form.

Deficient voice recognition requires that the Man-robot interface should best manage notably situations of failures, make the user speak at the right moment (this will involve interaction codes) and make available solutions which are alternatives to dialog and which are more effective.

Within the framework of the present invention, an audio diagnosis function makes it possible to solve problems of this type. This function executes by having the word to be tested pronounced by the voice synthesis software, text-to-speech. This word is then analyzed by the voice recognition. More precisely, the same word is pronounced, for example three times, each time changing the speed of the voice and its pitch, so as to have a representative sample of the ways of pronouncing the word. The three recognition rates returned by the voice recognition are then averaged, and it is this value which is the estimated percentage recognition of the word. There are two possible modes of audio diagnosis:

The "Together" mode operates as follows: all the words recorded in the Choice Box are listened to by the voice recognition, and then NAO calculates the estimated recognition rate as described elsewhere.

The "One by One" mode operates as follows: for a given line, the word to be analyzed is listened to by the voice recognition, as well as the other possible choices on the other lines, but not its alternatives situated on the same line as it. The benefit of this diagnosis is that if two "synonyms" resemble one another, for example "coucou!" and "coucou toi!", the estimated recognition rate will not be as low as it would be in "Together" mode (the rates would be very bad since they would often be confused by the voice recognition.) Indeed, it is not serious if two synonyms are confused by the robot.

Once the diagnosis has been performed on each line, the synonyms are arranged in descending order of estimated recognition rate, and the recognition rate of the best synonym is recorded at the end of the line.

Thus, the Choice Box is programmed to ask a user to confirm his answer when the robot is not certain of having recognized or interpreted it correctly. This mechanism is identical to that used by a human with deficient hearing or who is immersed in an environment rendering his understanding difficult. The robot will have different reactions according to the level of understanding of the user's answer. Several thresholds (for example the thresholds 51 and S2 defined as a comment to FIG. 5) are then fixed as a function of the recognition confidence calculated by the recognition software: for example, when the first recognition threshold S1 is not reached, the robot asks the player to repeat his answer; when the first threshold S1 is reached but a second, higher, recognition threshold S2 is not, the robot will pose a question the answer to which will make it possible to resolve the doubt. The robot can also provide help so that the user answers the robot correctly: it can give the list of possible choices, indicate the means of interaction therewith, repeat the question posed if there was one. The interaction codes are also very useful for alleviating the deficiencies of the voice recognition. Indeed, voice recognition does not make it possible to speak to the robot while it is speaking, and the lag between running the voice recognition and the moment at which it is actually active is fairly long. An audible code is thus played when the voice recognition is run, indicating to the user that he can speak. Thereafter, a fairly intuitive visual code, the LEDs of the ears which rotate, lets the user know that the robot is listening. The UIElements using voice recognition also offer an alternative means to this voice recognition, to allow the user to communicate successfully even in the case of repeated problems of understanding (this may be due to an extremely noisy environment for example). These alternative means may be tactile, audible, visual, etc. For example, the Choice Box allows the user to choose an answer by using the tactile sensor: pressing the fore sensor makes it possible to advance through the list of choices (the robot then states each choice), the aft sensor makes it possible to retreat through this list, the middle sensor makes it possible to validate his choice. It is also possible to envisage that the robot states the various choices, and that the user says "OK" when he hears the choice that he wants to validate. Or else, for a confirmation, instead of saying "yes" or "no" the user can press one of the robot's arms. The control module for the inputs/outputs of the communication channels of the various types 1, 2, 3 defined as a comment to FIG. 5 makes it possible to generate in a simple and user-friendly manner the functions for managing these combinations through links between the various inputs/outputs of the Choice Boxes.

Generally, the solution of the invention proposes a humanization of the interface, a simulation of the Man-Man interface. We know that three main factors come into play during direct communication between two humans: speech, of course, that is to say the words said, but also the tone of the voice and the visual elements. As proof, by observing, throughout their evolution, means of indirect communication, such as writing or instant messages, it is possible to see very clearly in what way the lack of information in dialog can as a general rule be alleviated by the addition of substitutes for direct communication, substitutes such as punctuation or more recently smileys. In all cases, despite today's great technological advances, these fundamental elements are still difficult to transpose in their entirety for man-robot communication. It is however possible to find artificial substitutes which improve the rendition of dialog. The robot's voice synthesis and voice recognition allow a speech equivalent. They are thus the pillars of its communication with a human. A humanoid robot has a fortiori the advantage of being able to render a large part of the visual elements of dialog, namely gestures and facial expressions. Indeed, although with its anthropomorphic body, its displacements are not as easy as a robot on wheels, its gestures may be more easily based on human behavior and therefore as easily deciphered as human movements. Communication then takes place more naturally.

The tone of the voice and facial expressions are nonetheless lacking from a robot with fixed face and tone. However, these two elements are compensated by other functions, codes which will convey these elements. They require more or less lengthy learning by the user. The objective is then to make this learning as short as possible and therefore the codes as coherent and as close as possible to what the user already knows.

By adapting Ben Shneiderman's basic laws of ergonomics, stated in his book Designing the User Interface: Strategies for Effective Human-Computer Interaction (published in 1997: http://www.cs.umd.edu/hcil/pubs/books/dtui.shtml) and normally applied to graphical interfaces, one achieves simple coherent codes and therefore natural and fluid interaction. These laws state the following principles: the coherence of the codes and interface elements, the presence of shortcuts for advanced users, the presence of immediate returns on the actions performed, the explicit end of dialogs, simple management of errors, the possibility of feedback, the user must feel himself to be master during the interaction and finally, lesser stimulation of the user's short-term memory.

Voice recognition and synthesis are limiting, notably through the absence of natural language and only single-user recognition making it possible to recognize only a limited number of words. The solution of the invention solves the problem of the non-use of natural language by robots so as to offer a sufficiently natural Man-robot interaction. Already, best use is made of the robot's voice synthesis. Notably, most of the UIElements of the robot using voice synthesis and/or recognition are regionalized. A francophone (respectively anglophone) user will thus be able to converse with his robot in French (respectively in English), thus maximizing the success of the interaction. Thereafter, best use is made of timings and interaction codes in order to improve the reactivity of the robot and to facilitate the success of the Man-robot communication. Thus, the Choice Box proposes several parameters like the waiting time for an answer from the user. It is thus ensured that the robot does not wait for too long before considering that the user has not answered at all, but also that it waits long enough in order for it to be possible for the voice recognition to be activated at the right moment. The interaction codes may be gestural, audible and/or visual. Thus an audible beep for the end of voice recognition lets the user know that the robot is no longer listening to him.

Moreover, in the solution of the invention, communication is rendered more natural by the use of several communication channels of different modalities, and particular behaviors on the part of the robot. Thus, the use of sound location and of face detection (notably its position) allows the robot to turn its head toward its human interlocutor, this seeming to be an established fact when addressing another human. The robot can also implement interlocutor identification (facial recognition, timbre of the voice, voice print etc.) so as to address a human in particular by using his name, characteristics which are specific thereto, for example, the historical log of the conversations and behaviors played by the robot. The robot can also know what the user thought of a behavior depending on whether he has stroked his tactile sensor (the Man liked the behavior), and then offer to play it during a verbal communication for example. The robot will attempt to act in a manner adapted to the situation. Thus, it can play animations, use its LEDs and broadcast sound, thereby allowing it to simulate the instinctive gestures that a human makes when he speaks (speaking with one's hands, etc.). The robot can also produce head nods. Several studies, notably that by Justine Cassell made in her article Social Dialogue With Embodied Conversational Agents (published in 2005:

http://citeseerx.ist.psu.edu/viewdoc/download-?doi=10.1.1.124.9 853&rep=rep1&type=pdf), have made it possible to prove that people consider that a machine or an avatar seems more interested in the conversation when this machine or avatar produces head nods, even when they are produced randomly. All these gestural signals (such as assenting or dissenting with one's head, arms or hands), sound signals, the chronology of the interaction, the location of the interlocutor, or else the detection of the user's intentions (is he advancing or retreating) make it possible to render the Man-robot interaction more natural and effective by rendering it closer to customary human codes. They therefore also solve some of the problems related to restrictive voice recognition. They are one of the advantages of the invention.

The screenshots of FIGS. 8 to 13 describe the way in which several cases of dialog between an NAO robot and an interlocutor may be programmed.

Figure 8A:
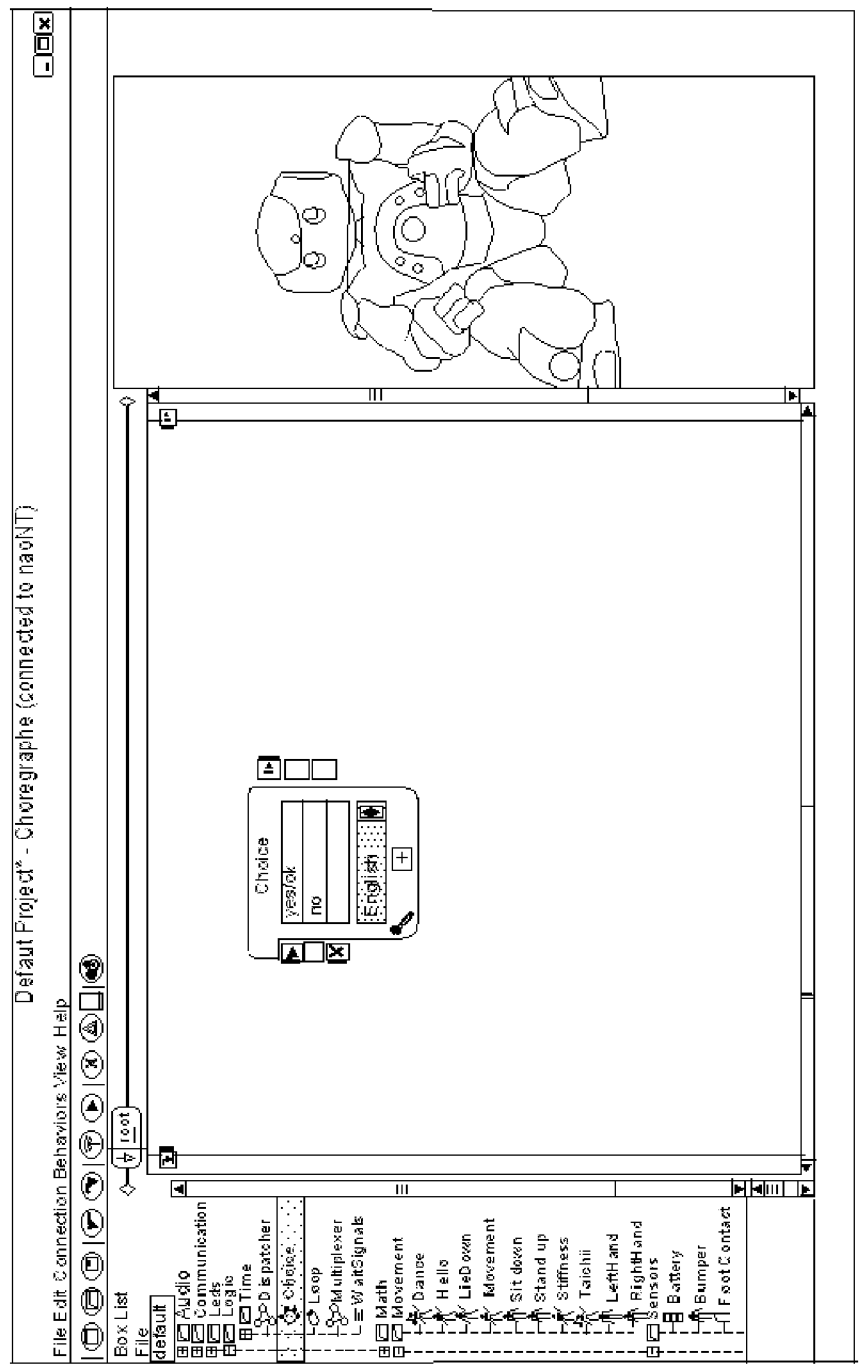
FIGS. 8a, 8b, 8c, 8d and 8e represent a sequence of screens making it possible to program a dialog with a humanoid robot with binary choice and option for changing the interaction language in an embodiment of the invention.
Figure 8C:
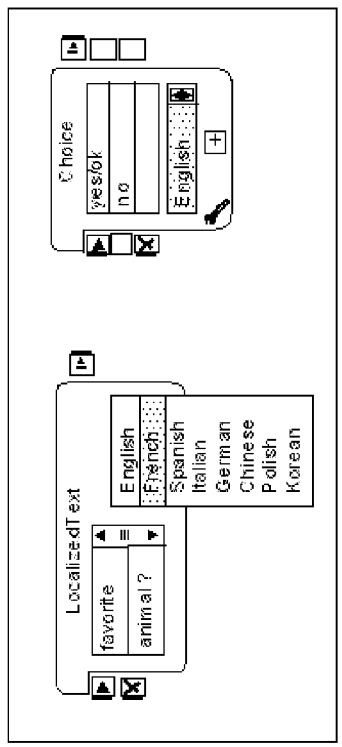
Figure 8E:
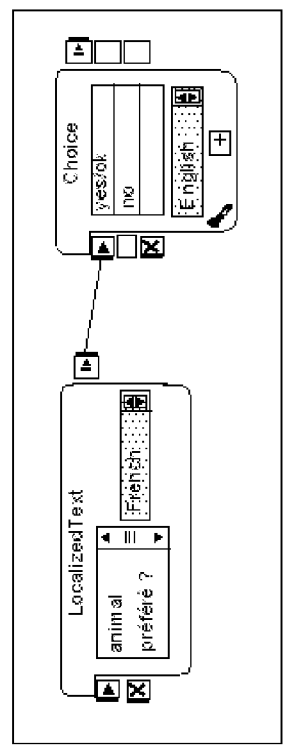
Figure 8B:
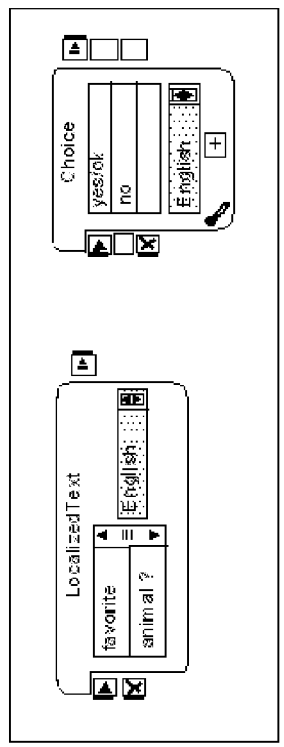
Figure 8D:
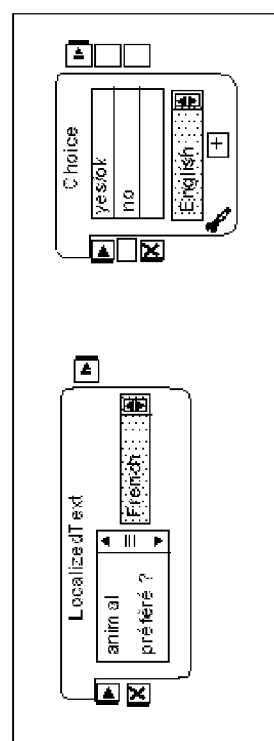

To use the Choice Box in the behavior, it is necessary to drag-and-drop it from Choregraphe's default library into the chart (FIG. 8*a*). A LocalizedText Box is added, which will allow the question to be edited in French and in English. The question "What is your favorite animal?" is written in English in the text plugin of the LocalizedText Box (FIG. 8*b*). One also wishes to edit the question in French. Accordingly, the Combo Box of the plugin of the box is used, and French is chosen. (FIG. 8*c*). The text of the question is then written in French in the text plugin which is empty when it is not edited: "Quel est ton animal préféré?" (FIG. 8*d*). The question must be input to the Choice Box, in order to be properly managed by the robot. The output of the LocalizedText Box is linked to the on Start input of the Choice Box (FIG. 8*e*).

Figure 9A:
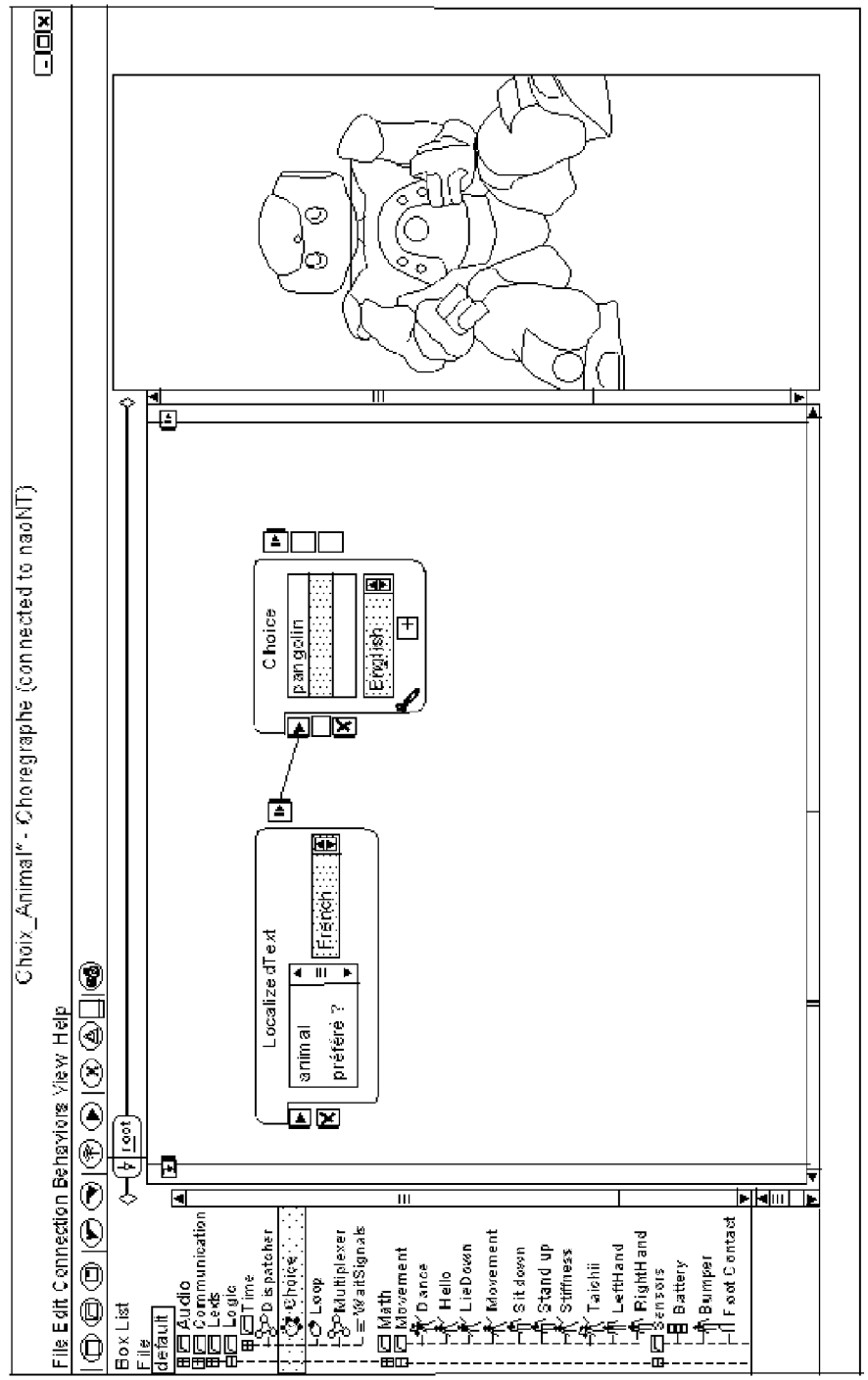
FIGS. 9a, 9b, 9c, 9d and 9e represent a sequence of screens making it possible to program a dialog with a humanoid robot with choice from a list and option for changing the interaction language in an embodiment of the invention.
Figure 9C:
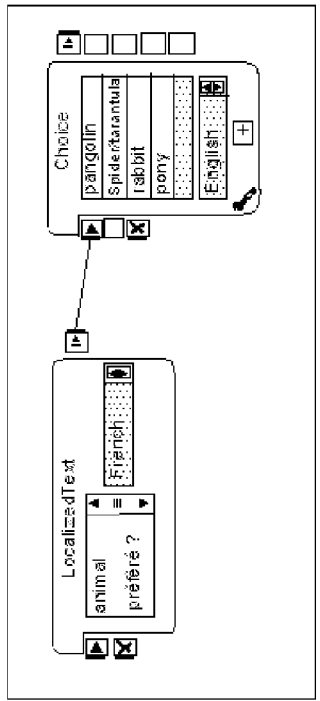
Figure 9E:
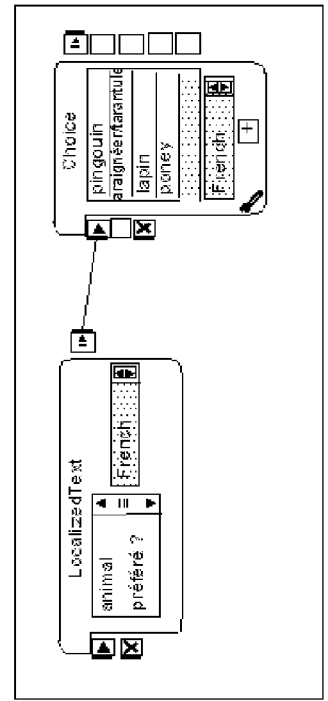
Figure 9B:
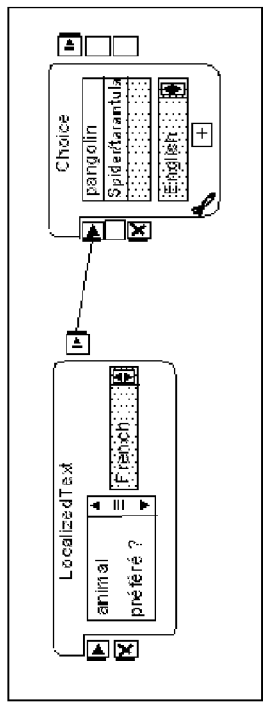
Figure 9D:
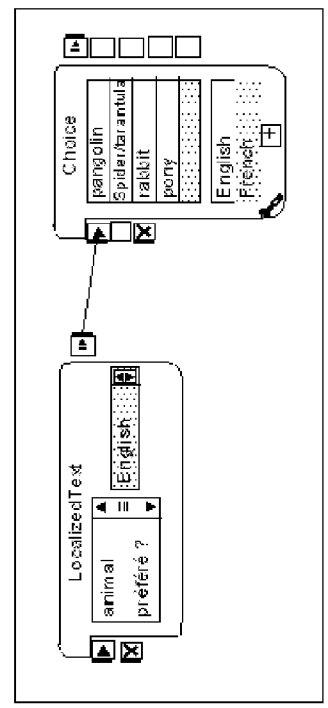

We shall now edit the choices, in English, as indicated by the Combo Box of the Choice Box. The default choices are removed from the Box. The first choice "pangolin" (FIG. 9*a*) is written in the first row of the table. In the second row, another animal is proposed: "spider", but a synonym "tarantula" is added, separated from spider by a slash '/'. This signifies that the robot considers spider and tarantula to be synonymous (FIG. 9*b*). Editing of the choices is ended by adding for example "rabbit" and "pony". It is noted that the number of rows adapts automatically when choices are added (FIG. 9*c*). The Combo Box is used to switch the language for editing the Choice Box to French (FIG. 9*d*). Just as for English, the list of choices is written, thus obtaining: "pangolin", "araignée/tarentule", "lapin" and "poney" (FIG. 9*d*).

Figure 10A:
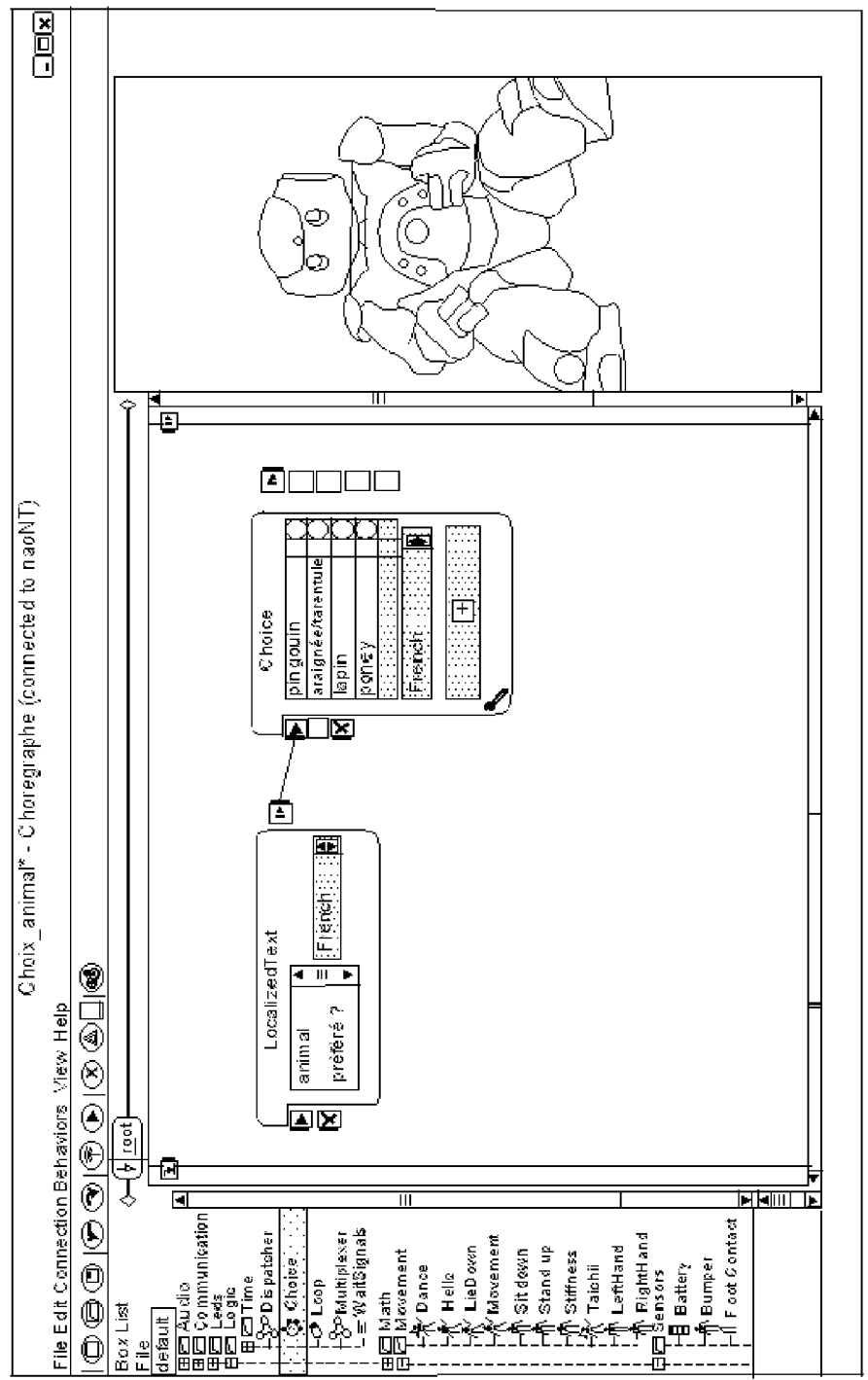

But we do not know whether the robot will indeed recognize these choices or not. We then wish to run the audio diagnosis function. We click on the "plus" (FIG. 10*a*). We then click on the evaluation icon (FIG. 10*b*). For each row, the words are evaluated (FIG. 10*c*). In the case of synonyms, the best is placed at the start, and the percentage indicated is then the result of the best synonym. The audio diagnosis is finished, it is then seen that "poney'" risks being very poorly recognized (FIG. 10*d*).

We then decide to change word and to put "cheval" instead (FIG. 11*a*). The diagnosis is rerun. "Cheval" obtains an excellent score of 82%, and we keep it (FIG. 11*b*).

Figure 12A:
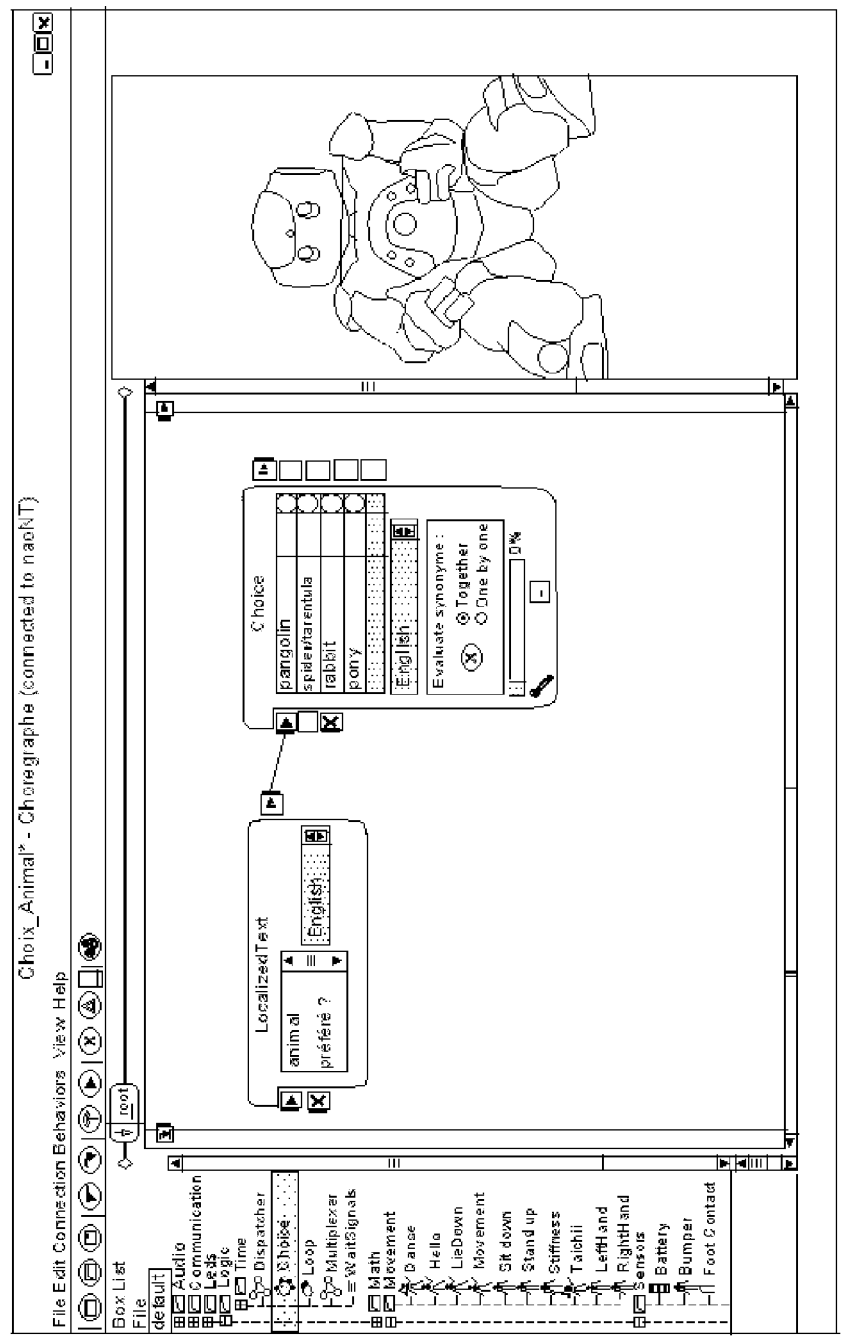
Figures 12B, 12C, 12D:
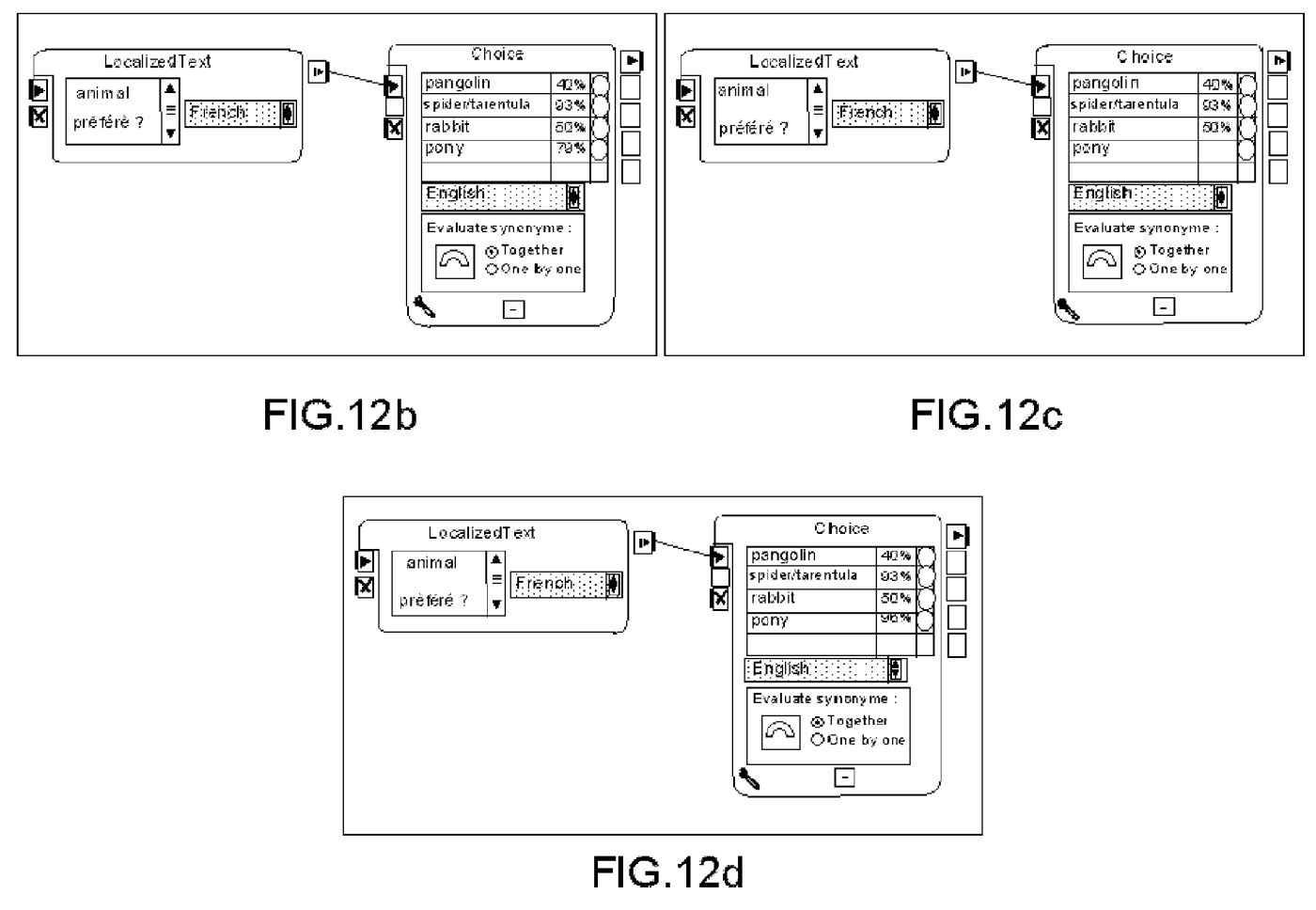

We switch back to English and run the diagnosis on the words in English (FIGS. 12*a*, 12*b*). The synonym "horse" is then added to "pony", as translation of "cheval" (FIG. 12*c*). The diagnosis is rerun, and it is noted that "horse", having a better score than "pony", has been placed in first position automatically (FIG. 12*d*).

Figure 13A:
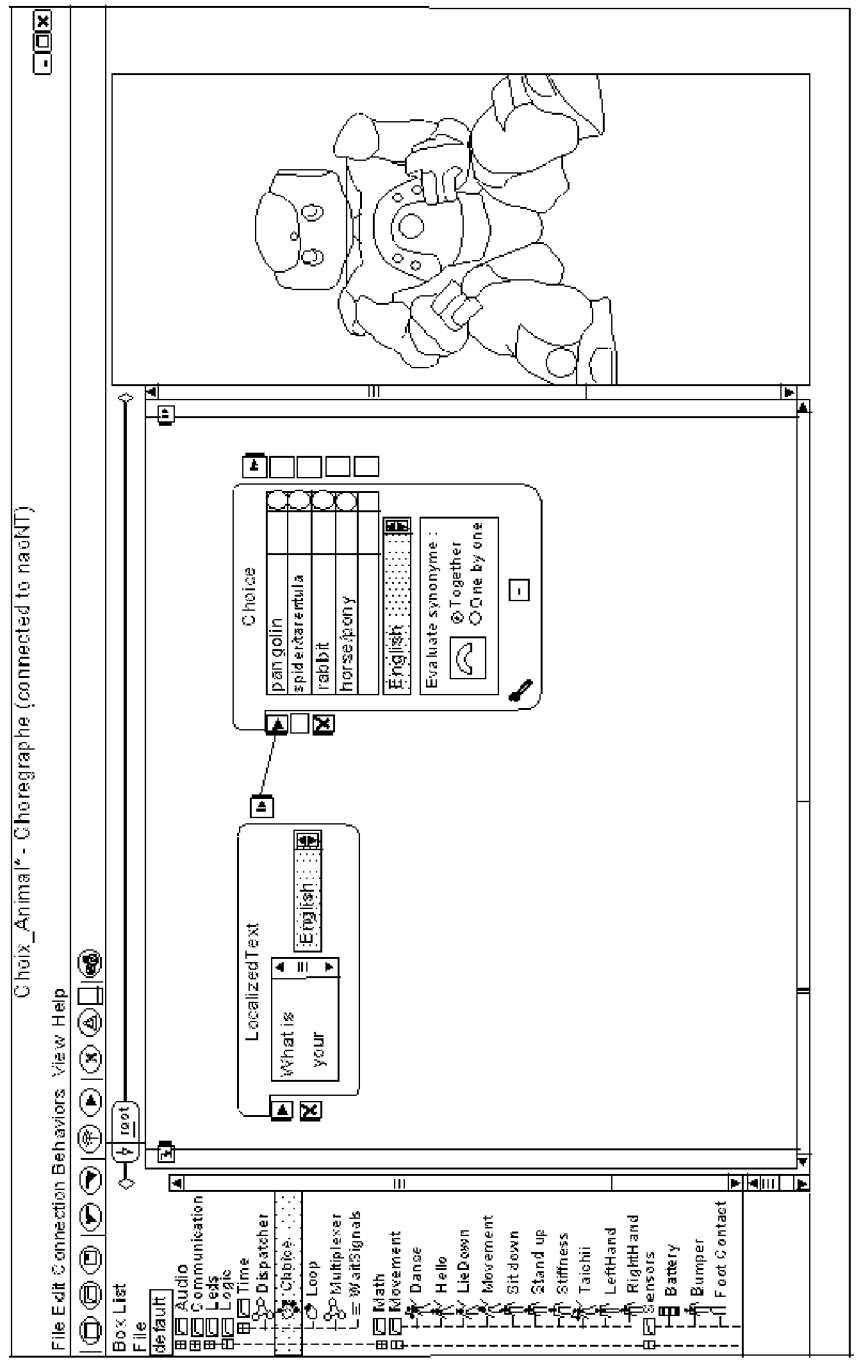
FIGS. 13a, 13b, 13c and 13d represent a sequence of screens making it possible to verify/modify the thresholds of the voice recognition tests comparing between several options of a list of choices in an embodiment of the invention.
Figure 13B:
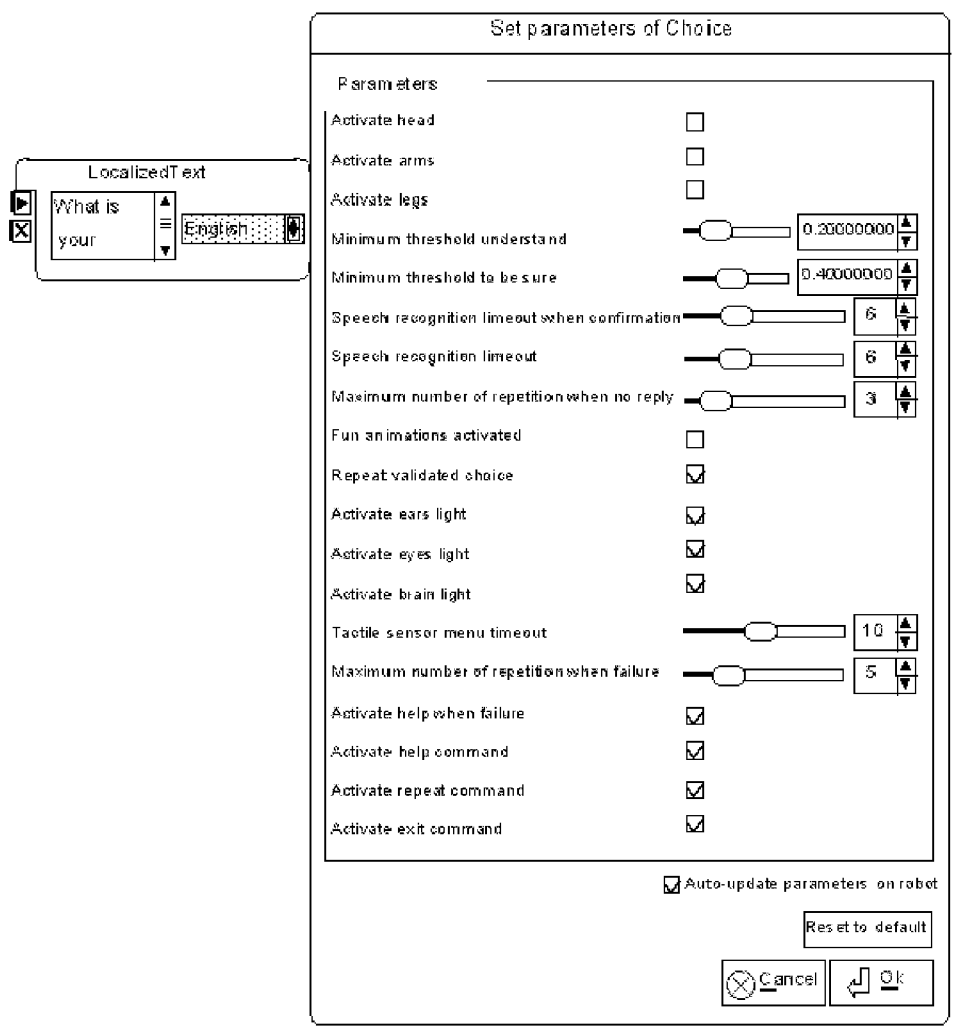

We shall now edit the parameters which may be adjusted. We click on the thumbwheel key at the bottom left of the Choice Box (FIG. 13*a*). The parametrization window opens (FIG. 13*b*); we tick the boolean parameter "activate arms"

Figure 13C:
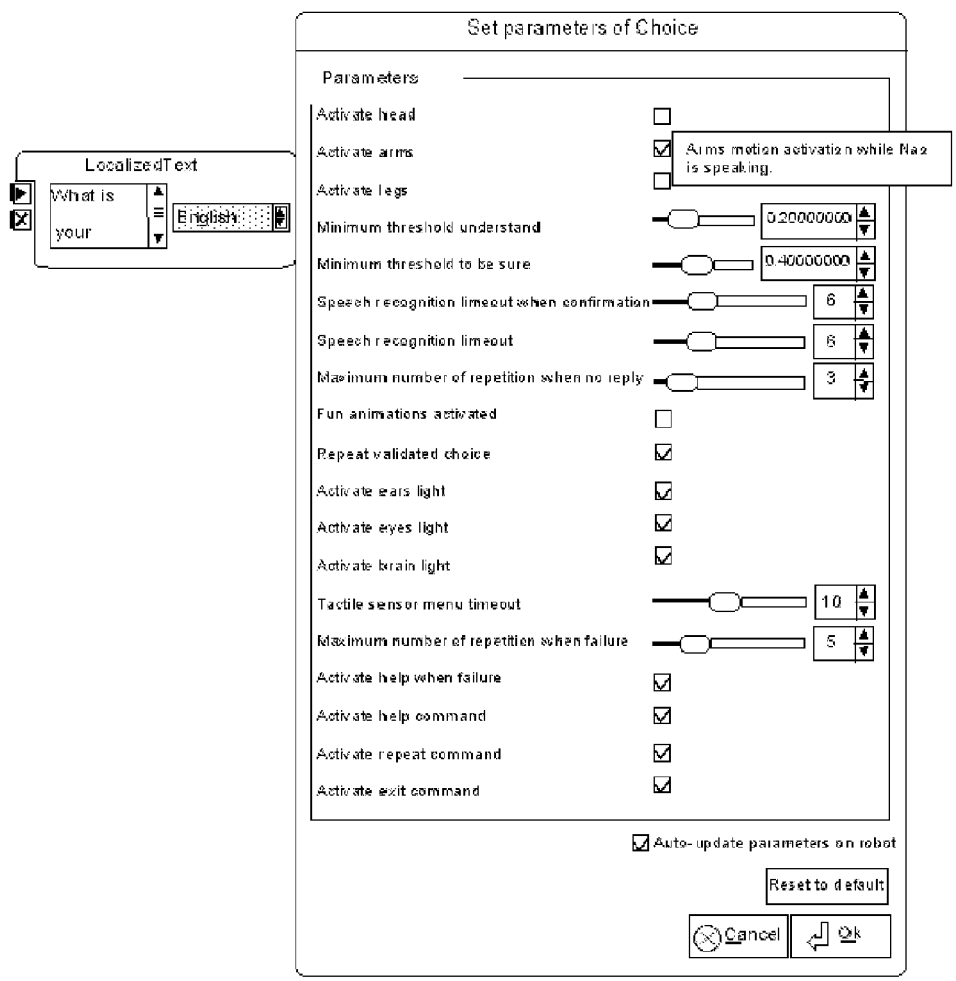

(FIG. 13c). Thus, the robot will move its arms while it is speaking. We click OK to validate this new parametrization.

Figure 13D:
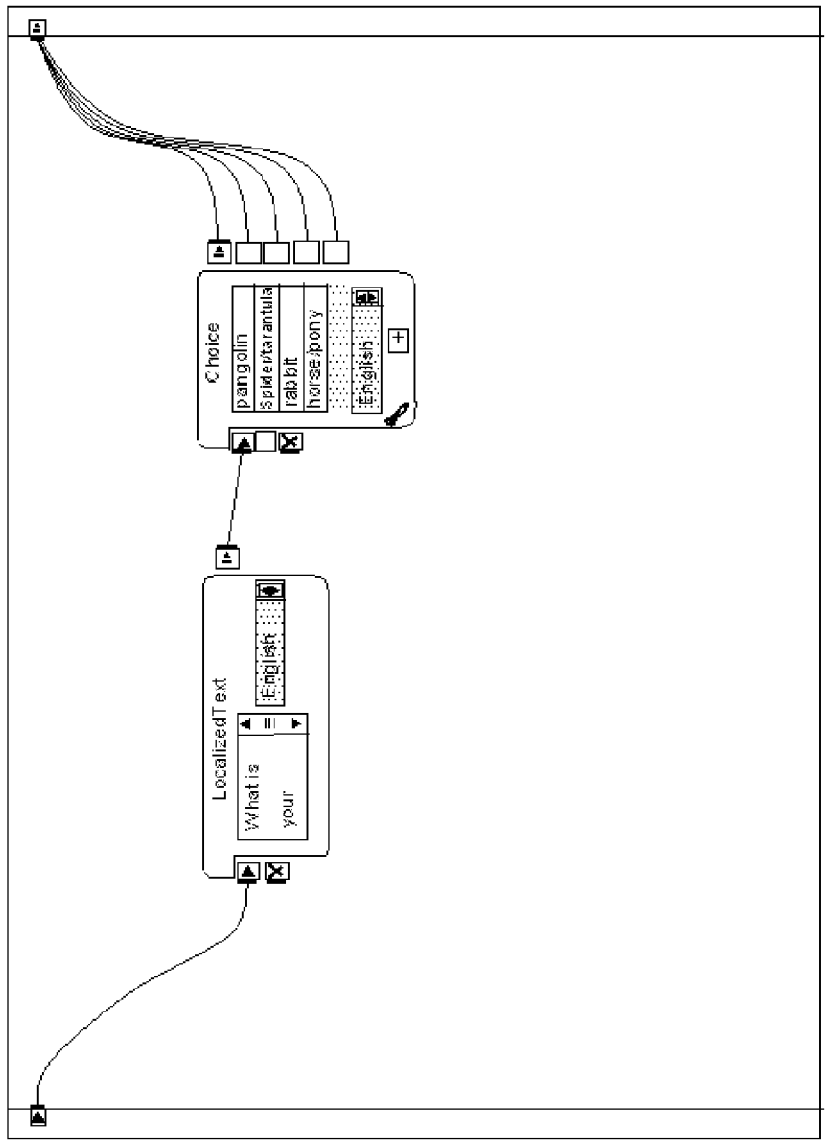

The general input of the behavior is linked to the input of the LocalizedText box, and the outputs of the Choice Box to the general output of the behavior (FIG. 13d).

An exemplary operation of the software programmed as in the example described hereinabove is now described.

The robot is slaved by virtue of the Choregraphe icon "enslave all motors on/off", and then it is stood upright by virtue of the "init pose" position of the pose library. The language of the robot is set to French by virtue of the parameter present on its Web page. The behavior is launched on the robot by virtue of the Play icon of Choregraphe.

Moving its arms, the robot asks "What is your favorite animal?", and then launches a listening sound signal. While it is listening, its eyes turn blue, as do its ears, and the tactile sensors of its head blink blue.

The user then answers "dolphin". The NAO's eyes become yellow while it analyzes what has just been said. It does not understand the answer: its eyes flash red twice, and its ears blue. It says "I didn't understand. You can answer: pangolin, spider, rabbit or horse. What is your favorite animal?", while moving its arms and it returns to the listening phase.

The user then answers "rabbit". The robot is not sure but believes it understood pangolin. Its eyes flash green once. It then says, while animatedly moving its arms, "I understood pangolin, is that correct?". The user answers "no". The robot flashes its eyes red once and launches a helping aid while moving its arms: "pangolin, spider, rabbit, or horse? You can also choose an answer with the help of my tactile sensor. What is your favorite animal?" and it returns to listening mode. The user then presses on the fore tactile sensor, the robot flashes its eyes blue once and says "pangolin". Next, the user presses again, the robot answers "spider" while flashing its eyes blue once. The third time the robot says "rabbit" with a blue flash of its eyes. The user then presses the middle tactile sensor to validate his choice. The robot flashes its eyes green once, then repeats "rabbit" and exits the box and the behavior.

Other interactions between communication channels of the robot are possible, such as those described hereinbelow.

The Choice Box uses, in a favored manner, voice recognition in combination with the tactile sensor so as to recognize the user's choice. Another possibility is to use the robot's vision, notably image recognition. This is object recognition and not concept recognition: if it is shown a bottle, it will recognize this same bottle and not that of another brand. One of the possibilities of the development software in its version making it possible to implement the invention is to have in this software the robot's camera return. The user can show the robot objects, see the image obtained in Choregraphe, and identify in hand the interesting object in the image. The user names it. The robot then analyzes the object and stores it in its database of images.

The user can then use these images as possible choices for a Choice Box.

For example, if the user wants to fill a Choice Box with names of objects, such as "bottle", "cup", "magazine". He fills the Choice Box with these words, and then takes a bottle, his favorite cup and the cover of a magazine and shows them to the robot so that it analyzes them as explained previously. The Choice Box then conducts a search through the database of images of the robot: if an object denoted "cup" is present, NAO then searches for it at the same time as it listens to the user, and so on and so forth for the other words. Thus, the user launches this Box on NAO, which listens to his choices. The user says "bottle" but the robot does not understand. After two goes, the robot explains that it can show him "bottle", "cup" and "magazine" because they are in its database. The user can while listening show the bottle which served for the recording (or of the same brand). The robot then acts as if it had recognized the word "bottle".

Within the framework of the present invention, it is also possible to program the robot so that it serves as agent for reception/reading, writing/sending and administration of a messaging account of a user of the robot. This application is described hereinbelow.

With the Mail application, NAO can notably read emails, reply to an email or send emails to a contact, but also add the author of a mail received to the contacts, delete a message, mark it as unread, reread it, read the next or the previous message.

Three Choice Boxes are used in this application, thus making this an indispensable element. The words have been chosen by virtue of the audio diagnosis.

When the application is run, the robot begins by looking to see whether the user has received new messages. If so, it reads the first new message and then runs a Choice Box without a question. If not, it runs this same Choice Box but with a question: "What would you like me to do?". The fact of being able to run a Choice Box with or without a question is therefore used in the mail application. This Choice Box allows the user to make his choice from among NAO's possible actions. These actions are written in the table of the plugin of the box. The "timeout" Choice Box output is useful, since in the case of a timeout, NAO reads the next message. A parameter "maximum number of repetition when no reply" is then set to 1: the robot exits this Choice Box at the first timeout. Moreover, the parameter "repeat validated choice" is deactivated, since after a choice by the user the robot runs a specific animation or action which shows clearly what it has understood. By virtue of the boolean parameters "activate head", "activate arms" and "activate legs", the robot will be animated with animations tailored to its pronouncements.

For example, the possible choices of this box are:
Record a reply/Reply to this mail/Reply to the mail/Reply;
Read again/Reread this mail/Reread the mail/Reread;
Next/Read the next/Read the next mail;
Previous/Read the previous mail/Read the previous message;
Mark as unread/Keep/Reread later;
Delete/Delete the mail/Delete the message;
Write a mail/Send a mail/Send;
Add to the contacts;
Exit/Quit/Pass/Stops/Stop/Cancel/Be quiet: "Exit" is one of the default choices of the Choice Box, which makes it possible here to exit the mail application.

If the user chooses the "Write a mail" option, he must firstly choose a contact from his address book. To carry out this choice function, a Choice Box with the question "Who do you want to write to?" as input is used. The list of choices is variable. Consequently, the table of the Choice Box has not been filled, the contact list is retrieved from the file which saves it and sent to the "choicesList" input of the Choice Box, of dynamic type. This time, the parameter "repeat validated choice" is activated, to indicate to the user that Nao has indeed understood to whom to send the message.

The parameter "maximum number of repetition when no reply" is for example set to 3, its default value so as, in the case of a timeout, not to send a mail to anybody, but indeed be able to cancel the sending of the mail and return to the main menu. Likewise, saying "Exit", default choice of the application, makes it possible to return to the main menu. A help function is for the case where the user no longer recalls his contacts. In this case, with the tactile sensor for example, NAO states the list of contacts.

Be it in this case of direct sending of a mail, or else in the case of replying to a message received, the robot will record the user's message.

Once the message has finished, the robot rereads the recorded message and then launches a Choice Box which proposes for example the following various interactions:

Replay it/Replay the message/Replay my message: NAO rereads the message.

Rerecord the message/Rerecord my message/Rerecord it: the message can be rerecorded, if the first is not suitable;

Don't send it/Don't send/Don't send the message: NAO will not send the message, and will then return to the previous level of the application;

Send it/Send the message/Send my message: NAO will send the message;

In case of timeout, the message is sent;

In the case of "other" exit from the Box which is not a timeout, such as a request to exit or failures with repetition, the application returns to the previous level.

The parameters are substantially the same as for the Choice Box of the main menu, with the parameter "Maximum number of repetition when no reply" set to 1. The parameters "speech recognition timeout", which indicate after how many times without a reply the robot considers that there is a timeout, and "speech recognition timeout when confirmation" can for example be set to 4 seconds instead of 6 by default, so that the user can easily say nothing and let the message be sent.

The Choice Box can also be configured in a static manner with parameters which are constant over the whole duration of use of the Box. But within the framework of the use of a system for automatically generating questions, the parameters may be adjusted automatically. For example, within the framework of use of a conversational agent such as that developed by the company As An Angel, said agent can configure the Choice Box as a function of the questions-answers that it will have generated automatically.

Other improvements have been made to the Choregraphe behavior development software, notably so as to facilitate the implementation of the present invention. A description thereof is given hereinbelow.

The Choregraphe Boxes are implemented by means of a script in one of the programming languages supported. If this Box has certain parametrizable aspects, such as the number of repetitions, the language used by the robot, the text that the robot must speak, these items of information are integrated directly into the script of the box. When it is desired to modify the parameters of the box, for example after having duplicated it in order to use it differently, it is necessary to modify the script of the box in order to change its behavior.

As this is a commonplace operation, which a user without a thorough knowledge of the script language used might wish to carry out, and also to improve the productivity of Choregraphe users, a special interface has been developed to be able to configure Box scripts. There are two aspects to this functionality.

In the Choregraphe interface, the user has the possibility of creating "Box parameters" in the window for editing the attributes of the Box, in the same way as he can create inputs and outputs for the Box. Each "Box parameter" has a name, a description, a type (from among boolean, integer, floating and string), and as a function of the type can have additional attributes, such as a default value. Finally a "Box parameter" may be defined as inheriting from the parent Box, and this will affect the way in which the value will be determined. Once "Box parameters" have been defined, the Box is displayed in its chart with an additional visual indicator in its bottom left corner. When the user clicks on this icon, a "Box parameters" editing dialog opens, and the user can define the value associated with each "Box parameter", within the framework of optional constraints defined in the attributes of the "Box parameter".

In the script of the Box, the author of the Box can henceforth access the "Box parameters" with the help of several functions taking the name of the "Box parameter" as argument. It can consult the current value of a "Box parameter" and change it. It can also create dynamic "Box parameters", which will not appear in Choregraphe, but which will be able to serve as temporary storage in the scripts of the Box. The current value of a parameter depends on the fact that it is marked as inheriting from the parent Box or not. If it is not (the default case), the "Box parameter" is specific to the Box, and when the script of the Box consults it, its current value is simply returned. If it is marked as inheriting, during the reading of the value, backtracking up through the hierarchy of Box charts takes place until a parent Box containing a "Box parameter" of the same name is found. If none is found the current value for the current Box is used.

Moreover, a software module is available to the robot allowing it to recognize objects which enter the field of view of its camera. However, the objects to be recognized must firstly be learned in a learning phase. This learning is carried out with the help of a specific interface in Choregraphe.

This interface displays in real time the video dispatched by the robot's camera. The image is available only when Choregraphe is connected to a robot having a camera and a correctly configured video capture module. When the video display is activated, the user can trigger learning. A countdown then appears on the image, and the user then has for example 4 seconds to present an object in front of the camera. At the end of the countdown images are captured and recorded. The user must then outline the object of interest in the image by drawing a polygon on the fixed image. Once the polygon has been closed, a dialog opens asking the user to enter key words defining the object. Each learning generates an entry in a database which is saved by Choregraphe on the user's computer. Once the learning has finished, a button makes it possible to dispatch a pared down version of the database to the robot. The objects recognition module will then use this database, and when an object is recognized, an event containing the associated key words will be triggered on the robot.

Choregraphe is moreover an editor of behaviors for the robot. As described previously as a comment to FIG. 4, a behavior is an object similar to a computer program, which may be executed by the robot. In order to install and to execute these behaviors on the robot, there has been development of an interface for managing the behaviors on the robot. When Choregraphe is connected to a robot, an entry of the menus of the application makes it possible to display the behavior manager. This is a modal window displaying a list of the behaviors installed on the robot, as well as a set of buttons for manipulating them.

For each installed behavior is displayed its name, its state (currently executing or not) and an attribute defining whether the behavior must be executed when the robot is started. To start or stop a behavior, it suffices to click on the icon displaying its current state, the effect of which is to toggle the state. Once the behavior is finished the state switches back automatically to "stopped". The attribute "launch on startup" is a Box to be ticked. It indicates the current value of the attribute, and the user can simply click above to change this value. The buttons displayed alongside the list of behaviors make it possible to add some, to delete some, and to transfer some to the user's computer. The user can thus very easily manipulate the behaviors installed on the robot, as if they were files on his computer. In particular, a user can download a behavior, modify it, and reinstall it on the robot, without having to record it on his computer.

The behaviors installed by the user can then execute in parallel, under the constraints of temporal coherence and between behaviors defined by the various behavior Boxes, the behavior Frames and the Timeline.

The examples described hereinabove are given by way of illustration of embodiments of the invention. They do not in any way limit the field of the invention, which is defined by the claims which follow.

The invention claimed is:

1. A humanoid robot comprising at least two channels for natural communication of messages with at least one interlocutor according to different modalities, said at least two channels each being chosen from a group of channels comprising receive, send channels, and a control module for the inputs/outputs of said channels, wherein said control module is configured to improve the understanding of the messages received by said robot based on execution of at least one function chosen from a group of functions comprising a function of combining messages received/sent on a first channel and on a second channel, and a function of sending a second message generated based on a first message received on a channel.

2. The humanoid robot of claim 1, wherein said communication channels are chosen from a group of communication channels for sending and/or receiving audible, visual, tactile, gestural, positional or symbolic messages.

3. The humanoid robot of claim 2, wherein a first communication channel is a sound send channel and a second communication channel is a channel for receiving gestures and/or positions from at least one part of the robot by said at least one interlocutor, said gestures and/or positions being representative of inputs communicated by the interlocutor to the robot, the specifications of said inputs being defined by the robot to the interlocutor by the message sent on the first channel.

4. The humanoid robot of claim 3, further comprising a third tactile communication channel by which the interlocutor validates the inputs into the second channel.

5. The humanoid robot of claim 2, wherein a first communication channel is a channel for receiving sound messages and a second communication channel is a channel for sending sound messages and in that said control module is able to evaluate the confidence level of the understanding by said robot of a first message received on said first channel and to generate at least one second message on said second channel whose content depends on said confidence level.

6. The humanoid robot of claim 5, wherein the first channel comprises a filter for voice recognition of the messages received by a list of expressions with each of which is associated an expected recognition rate and in that the content of said second message is chosen by a heuristic from a group of requests comprising a request for repetition of said first message on the first channel, a request for confirmation by a third message to be sent by the interlocutor on the first channel of a subset of the expressions of the filter, and a request for sending by the interlocutor of at least another message on at least a third channel.

7. The humanoid robot of claim 6, further being configured for sending on the second channel a signal of start of listening on the first channel so as to ensure the sequencing in half-duplex mode of the messages on the first and the second channel.

8. The humanoid robot of claim 6, wherein said choice heuristic is a function of the position of the real recognition rates with respect to thresholds determined on the basis of the expected recognition rates.

9. The humanoid robot of claim 6, wherein said third channel is a channel for tactile reception or for receiving gestures from a part of the robot.

10. The humanoid robot of claim 5, further comprising a module for interfacing with an electronic mail system, said interfacing module allowing a holder of an account on said electronic system to use said robot as agent for receiving/reading the electronic messages on the second channel, for writing/sending on the first channel and for administering said account by dialog, using said first and second channels.

11. The humanoid robot of claim 6, wherein said third channel is a channel for visual reception of images of objects corresponding to the list of expressions of the filter of the first channel, said images being compared with a database of images of said objects previously recorded with said expressions and which is accessible by said control module for the inputs/outputs of said communication channels.

12. The humanoid robot of claim 2, wherein a first communication channel is a channel for receiving visual messages and a second communication channel is a channel for sending sound messages and in that said control module is able to evaluate the confidence level of the understanding by said robot of a first message received on said first channel and to generate at least one second message on said second channel whose content depends on said confidence level.

13. The humanoid robot of claim 12, wherein the first channel comprises a filter for recognizing images of the messages received by a list of expressions with each of which is associated an expected recognition rate and in that the content of said second message is chosen by a heuristic from a group of requests comprising a request for repetition of said first message on the first channel, a request for confirmation by a third message to be sent by the interlocutor on a third channel for receiving sound messages of a subset of the expressions of the filter, and a request for sending by the interlocutor of at least another message on at least a fourth channel.

14. The humanoid robot of claim 1, wherein at least one of the channels is a hybrid channel receiving as inputs the outputs of two channels, merged by said control module for the inputs and outputs.

15. A method of control of the communications of a humanoid robot with at least one interlocutor comprising at least two steps of message transmission by communication channels using different modalities, said two steps each being chosen from a group of channels comprising receive, send channels, and a step of controlling the inputs/outputs of said channels, wherein said controlling step is configured to improve the understanding of the messages received by said robot based on execution of at least one function chosen from a group of functions comprising a function of combining messages received/sent on a first channel and on a second channel, and a function of sending a second message generated based on a first message received on a channel.

16. A computer program comprising program code instructions allowing the execution of the method as claimed in claim 15 when the program is executed on a computer, said program being configured to allow a humanoid robot comprising at least two channels for natural communication of messages with at least one interlocutor according to different modalities, said at least two channels each being chosen from a group of channels comprising receive, send channels, and a subroutine for control of the inputs/outputs of said channels, wherein said control subroutine is configured to improve the understanding of the messages received by said robot based on execution at least one function chosen from a group of functions comprising a function of combining messages received/sent on a first channel and on a second channel, and a function of sending a second message generated based on a first message received on a channel.

17. A method of editing and controlling a communication interface between at least one humanoid robot and at least one interlocutor, said at least one humanoid robot comprising at least two channels for natural communication of messages with the at least one interlocutor according to different modalities, said at least two channels each being chosen from a group of channels comprising receive, send channels, and a control module for the inputs/outputs of said channels, said control module being configured to improve the understanding of the messages received by said robot based on execution of at least one function chosen from a group of functions comprising a function of combining messages received/sent on a first channel and on a second channel, and a function of sending a second message generated based of a first message received on a channel, further comprising a step of programming said chosen function.

18. The method of editing and controlling of claim 17, wherein said step of programming said chosen function comprises at least one sub-step of defining a first communication channel in the guise of sound send channel and a second communication channel in the guise of channel for receiving at least one gesture impressed on a limb of the robot by said at least one interlocutor, a sub-step of defining a correspondence between said at least one gesture and an input communicated by the interlocutor to the robot, and a sub-step of defining the specifications of said inputs by generating at least one message to be sent by the robot to the interlocutor on the first channel.

19. The method of editing and controlling of claim 18, further comprising a sub-step of defining a third tactile communication channel whereby the interlocutor validates the inputs performed on the second channel.

20. The method of editing and controlling of claim 17, wherein said step of programming said chosen function comprises at least one sub-step of defining a first communication channel in the guise of channel for receiving sound messages and a second communication channel in the guise of channel for sending sound messages, a sub-step of defining a function for evaluating a confidence level of the understanding by said robot of a first message received on said first channel and a sub-step of defining the generation of at least one second message on said second channel whose content depends on said confidence level.

21. A computer program comprising program code instructions for execution of the method of claim 17 when the program is executed on a computer, said program being configured to allow a user to program a humanoid robot comprising at least two channels for natural communication of messages with at least one interlocutor according to different modalities, said at least two channels each being chosen from a group of channels comprising receive, send channels, and a subroutine for controlling the inputs/outputs of said channels, wherein a module for programming in the subroutine for control of at least one function to be executed by the robot and chosen from the group of functions comprising a function of combining messages received/sent on a first channel and on a second channel, and a function of sending of a second message generated based on a first message received on a channel.

22. The computer program of claim 21, further comprising a module for programming the passing of at least one parameter to a control Box.

* * * * *